US009051514B2

(12) United States Patent
Nair et al.

(10) Patent No.: US 9,051,514 B2
(45) Date of Patent: *Jun. 9, 2015

(54) HIGH FLOW LIQUID CRYSTALLINE POLYMER COMPOSITION

(75) Inventors: Kamlesh P. Nair, Florence, KY (US); Joseph J. Grenci, Florence, KY (US); Sayanti Basu, Pasadena, TX (US); Steven D. Gray, Mequon, WI (US)

(73) Assignee: Ticona LLC, Florence, KY (US)

( * ) Notice: Subject to any disclaimer, the term of this patent is extended or adjusted under 35 U.S.C. 154(b) by 66 days.

This patent is subject to a terminal disclaimer.

(21) Appl. No.: 13/594,900

(22) Filed: Aug. 27, 2012

(65) Prior Publication Data

US 2013/0048914 A1    Feb. 28, 2013

Related U.S. Application Data

(60) Provisional application No. 61/528,383, filed on Aug. 29, 2011, provisional application No. 61/664,811, filed on Jun. 27, 2012.

(51) Int. Cl.
| C09K 19/54 | (2006.01) |
| C09K 19/32 | (2006.01) |
| C09K 19/30 | (2006.01) |
| C08L 77/12 | (2006.01) |
| C09K 19/38 | (2006.01) |
| C09K 19/22 | (2006.01) |
| C09K 19/34 | (2006.01) |
| C09K 19/48 | (2006.01) |
| C09K 19/04 | (2006.01) |

(52) U.S. Cl.
CPC ............. *C09K 19/22* (2013.01); *C09K 19/3086* (2013.01); *C09K 19/322* (2013.01); *C09K 19/3444* (2013.01); *C09K 19/3809* (2013.01); *C09K 19/48* (2013.01); *C08L 77/12* (2013.01); *C09K 2019/0481* (2013.01)

(58) Field of Classification Search
CPC ........ C09K 19/22; C09K 19/48; C09K 19/54; C09K 19/322; C09K 19/3086; C09K 19/3809; C09K 19/3444; C09K 2019/0481; C08G 69/44; C08L 67/03; C08L 67/04; C08L 77/12
USPC ................ 252/299.01, 299.6, 299.61, 299.62, 252/299.63; 523/205, 207; 528/289, 292; 524/227
See application file for complete search history.

(56) References Cited

U.S. PATENT DOCUMENTS

| 4,002,600 A | 1/1977 | Habermeier |
| 4,038,416 A | 7/1977 | Mori et al. |
| 4,083,829 A | 4/1978 | Calundann et al. |
| 4,132,840 A | 1/1979 | Hugl et al. |
| 4,161,470 A | 7/1979 | Calundann et al. |
| 4,163,099 A | 7/1979 | Buxbaum et al. |
| 4,184,996 A | 1/1980 | Calundann |
| 4,219,461 A | 8/1980 | Calundann |
| 4,256,624 A | 3/1981 | Calundann |
| 4,279,803 A | 7/1981 | Calundann |
| 4,318,841 A | 3/1982 | East et al. |
| 4,330,457 A | 5/1982 | East et al. |
| 4,330,668 A | 5/1982 | Hideo et al. |
| 4,337,190 A | 6/1982 | Calundann |
| 4,339,375 A | 7/1982 | Calundann et al. |
| 4,351,917 A | 9/1982 | Calundann et al. |
| 4,351,918 A | 9/1982 | Charbonneau et al. |
| 4,355,132 A | 10/1982 | East et al. |
| 4,355,134 A | 10/1982 | Charbonneau et al. |
| 4,375,530 A | 3/1983 | Hay et al. |
| 4,387,210 A | 6/1983 | Katoh et al. |
| 4,393,191 A | 7/1983 | East |
| 4,421,908 A | 12/1983 | East |
| 4,429,105 A | 1/1984 | Charbonneau |
| 4,434,262 A | 2/1984 | Buckley et al. |
| 4,473,682 A | 9/1984 | Calundann et al. |
| 4,511,709 A | 4/1985 | Yoon et al. |
| 4,522,974 A | 6/1985 | Calundann et al. |
| 4,563,508 A | 1/1986 | Cottis et al. |
| 4,581,399 A | 4/1986 | Yoon |

(Continued)

FOREIGN PATENT DOCUMENTS

| CN | 1715313 A | 1/2006 |
| CN | 101006138 A | 7/2007 |

(Continued)

OTHER PUBLICATIONS

Abstract of Japanese Patent—JPH06347770A, Dec. 22, 1994, 2 pages.
Abstract of Japanese Patent—JPH09143347A, Jun. 3, 1997, 1 page.
Abstract of Japanese Patent—JPH09249813A, Sep. 22, 1997, 2 pages.
Abstract of Japanese Patent—JPH1160927A, Mar. 5, 1999, 2 pages.
Abstract of Japanese Patent—JP2004182748A, Jul. 2, 2004, 1 page.
Abstract of Japanese Patent—JP2005248052A, Sep. 15, 2005, 1 page.
Abstract of Japanese Patent—JP2005298772A, Oct. 27, 2005, 1 page.

(Continued)

*Primary Examiner* — Shean C Wu
(74) *Attorney, Agent, or Firm* — Dority & Manning, P.A.

(57) ABSTRACT

A liquid crystalline polymer composition that contains a liquid crystalline polymer and an aromatic amide oligomer is provided. The oligomer can serve as a flow aid by altering intermolecular polymer chain interactions, thereby lowering the overall viscosity of the polymer matrix under shear. The oligomer is also not easily volatized or decomposed during compounding, molding, and/or use, which minimizes off-gassing and the formation of blisters that would otherwise impact the final mechanical properties of a part made from the polymer composition. While providing the benefits noted, the aromatic amide oligomer does not generally react with the polymer backbone of the liquid crystalline polymer to any appreciable extent so that the mechanical properties of the polymer are not adversely impacted.

39 Claims, 3 Drawing Sheets

(56) References Cited

U.S. PATENT DOCUMENTS

| | | | |
|---|---|---|---|
| 4,611,025 A | 9/1986 | Akkapeddi et al. | |
| 4,650,836 A | 3/1987 | George et al. | |
| 4,778,858 A | 10/1988 | Ginnings | |
| 4,831,104 A | 5/1989 | Aya et al. | |
| 4,851,562 A | 7/1989 | de Jonge et al. | |
| 4,904,752 A | 2/1990 | Kanoe et al. | |
| 4,952,662 A | 8/1990 | Finke et al. | |
| 4,968,737 A | 11/1990 | Finke et al. | |
| 4,980,444 A | 12/1990 | de Jonge et al. | |
| 4,980,504 A | 12/1990 | de Jonge et al. | |
| 5,093,464 A | 3/1992 | Yoon et al. | |
| 5,102,935 A | 4/1992 | Heinz et al. | |
| 5,120,820 A | 6/1992 | Fujiwara et al. | |
| 5,162,489 A | 11/1992 | de Jonge et al. | |
| 5,171,823 A | 12/1992 | Charbonneau et al. | |
| 5,204,443 A | 4/1993 | Lee et al. | |
| 5,221,730 A | 6/1993 | Morris et al. | |
| 5,237,038 A | 8/1993 | Morris et al. | |
| 5,258,470 A | 11/1993 | Poll et al. | |
| 5,271,865 A | 12/1993 | Hittich et al. | |
| 5,298,593 A | 3/1994 | Fujiwara et al. | |
| 5,310,776 A | 5/1994 | Takagi et al. | |
| 5,324,795 A | 6/1994 | Suenaga | |
| 5,334,343 A | 8/1994 | Po' et al. | |
| 5,352,746 A | 10/1994 | Asai et al. | |
| 5,401,779 A * | 3/1995 | Edelman et al. | 252/299.01 |
| 5,446,124 A | 8/1995 | Niwano et al. | |
| 5,480,907 A | 1/1996 | Hayashi et al. | |
| 5,496,893 A | 3/1996 | Gagné et al. | |
| 5,500,294 A | 3/1996 | Sakumoto et al. | |
| 5,510,189 A | 4/1996 | Sakumoto et al. | |
| 5,534,187 A | 7/1996 | Miyazawa et al. | |
| 5,541,240 A | 7/1996 | Makhija et al. | |
| 5,541,267 A | 7/1996 | Akkapeddi et al. | |
| 5,563,216 A | 10/1996 | Niwano et al. | |
| 5,573,752 A | 11/1996 | Ranganathan et al. | |
| 5,609,956 A | 3/1997 | Sakumoto et al. | |
| 5,614,316 A | 3/1997 | Hashimoto et al. | |
| 5,616,680 A | 4/1997 | Linstid, III | |
| 5,766,507 A | 6/1998 | Nakai | |
| 5,779,936 A | 7/1998 | Miyasawa et al. | |
| 5,976,406 A | 11/1999 | Nagano et al. | |
| 5,997,765 A | 12/1999 | Furuta et al. | |
| 6,114,492 A | 9/2000 | Linstid, III et al. | |
| 6,294,618 B1 | 9/2001 | Soelch | |
| 6,312,772 B1 | 11/2001 | Kuder et al. | |
| 6,376,076 B1 | 4/2002 | Ohbe et al. | |
| 6,498,274 B1 | 12/2002 | Brown et al. | |
| 6,514,611 B1 | 2/2003 | Shepherd et al. | |
| 6,613,847 B2 | 9/2003 | Soelch | |
| 6,649,730 B2 | 11/2003 | Okamoto et al. | |
| 6,656,386 B2 | 12/2003 | Suenaga et al. | |
| 6,680,002 B2 | 1/2004 | Yamauchi et al. | |
| 6,702,956 B2 | 3/2004 | Maeda et al. | |
| 6,740,728 B2 | 5/2004 | Ding et al. | |
| 6,755,992 B2 | 6/2004 | Okamoto et al. | |
| 7,179,401 B2 | 2/2007 | Ueno et al. | |
| 7,238,714 B2 | 7/2007 | Nakao et al. | |
| 7,335,318 B2 | 2/2008 | Asahara et al. | |
| 7,343,675 B2 | 3/2008 | Smith et al. | |
| 7,344,657 B2 | 3/2008 | Okamoto et al. | |
| 7,393,467 B2 | 7/2008 | Asahara et al. | |
| 7,405,250 B2 | 7/2008 | Kim | |
| 7,507,784 B2 | 3/2009 | Dingemans et al. | |
| 7,534,914 B2 | 5/2009 | Koike et al. | |
| 7,592,413 B2 | 9/2009 | Citron et al. | |
| 7,648,748 B2 | 1/2010 | Nakane et al. | |
| 7,655,155 B2 * | 2/2010 | Jung et al. | 252/299.01 |
| 7,754,717 B2 | 7/2010 | Dimauro et al. | |
| 7,759,344 B2 | 7/2010 | Booker et al. | |
| 7,790,793 B2 | 9/2010 | Schmidt et al. | |
| 7,795,315 B2 | 9/2010 | Chen et al. | |
| 7,803,307 B2 | 9/2010 | Zimmerman | |
| 7,824,572 B2 | 11/2010 | Okamoto | |
| 7,825,176 B2 | 11/2010 | Kim et al. | |
| 8,034,255 B2 | 10/2011 | Goldfinger | |
| 8,084,476 B2 | 12/2011 | Koike et al. | |
| 8,084,637 B2 | 12/2011 | Chopra et al. | |
| 8,142,683 B2 | 3/2012 | Murouchi et al. | |
| 8,309,734 B2 | 11/2012 | Bissantz et al. | |
| 2002/0028905 A1 | 3/2002 | Yokota | |
| 2004/0135118 A1 | 7/2004 | Waggoner | |
| 2006/0019110 A1 * | 1/2006 | Sato et al. | 428/474.4 |
| 2006/0073306 A1 | 4/2006 | Nakane et al. | |
| 2007/0106035 A1 | 5/2007 | Gomurashvili et al. | |
| 2007/0185118 A1 | 8/2007 | Hooft Van Huijsduijnene et al. | |
| 2007/0232594 A1 | 10/2007 | Yokoyama et al. | |
| 2008/0139754 A1 * | 6/2008 | Uehara et al. | 525/450 |
| 2009/0001317 A1 | 1/2009 | Okamoto | |
| 2009/0104378 A1 * | 4/2009 | Yamahara et al. | 428/1.31 |
| 2009/0111950 A1 | 4/2009 | Yamazaki et al. | |
| 2009/0224203 A1 * | 9/2009 | Jung et al. | 252/299.61 |
| 2009/0275697 A1 | 11/2009 | Waggoner et al. | |
| 2009/0308643 A1 * | 12/2009 | Cho et al. | 174/256 |
| 2010/0130743 A1 | 5/2010 | Wada et al. | |
| 2011/0071304 A1 | 3/2011 | Fujimaki et al. | |
| 2011/0184188 A1 | 7/2011 | Wada et al. | |
| 2011/0196076 A1 * | 8/2011 | Yoshino et al. | 524/105 |
| 2012/0022202 A1 | 1/2012 | Suh et al. | |
| 2013/0048908 A1 | 2/2013 | Gray et al. | |
| 2013/0048909 A1 | 2/2013 | Nair et al. | |
| 2013/0048910 A1 | 2/2013 | Nair et al. | |
| 2013/0048911 A1 | 2/2013 | Nair et al. | |
| 2013/0053531 A1 | 2/2013 | Nair et al. | |
| 2013/0053532 A1 | 2/2013 | Nair et al. | |
| 2013/0053533 A1 | 2/2013 | Nair et al. | |
| 2013/0062558 A1 * | 3/2013 | Nair et al. | 252/299.5 |

FOREIGN PATENT DOCUMENTS

| | | |
|---|---|---|
| CN | 101427162 A | 5/2009 |
| EP | 0 055 480 | 7/1982 |
| EP | 0 071 968 | 2/1983 |
| EP | 0 376 615 | 7/1990 |
| EP | 0 396 955 | 11/1990 |
| EP | 0 413 375 | 2/1991 |
| EP | 0 450 652 | 10/1991 |
| EP | 0 569 980 | 11/1993 |
| EP | 0 852 249 | 7/1998 |
| EP | 1 095 930 | 5/2001 |
| EP | 1 792 942 | 6/2007 |
| GB | 2 158 832 | 11/1985 |
| JP | S63-250353 | 10/1988 |
| JP | 2010-180374 A | 8/2010 |
| WO | WO 95/33803 | 12/1995 |
| WO | WO 98/22103 | 5/1998 |
| WO | WO 2004/058851 | 7/2004 |
| WO | WO 2007/038373 | 4/2007 |
| WO | 2010/047370 A1 | 4/2010 |

OTHER PUBLICATIONS

Abstract of Japanese Patent—JP2007238851A, Sep. 20, 2007, 1 page.
Abstract of Japanese Patent—JP2009108179A, May 21, 2009, 1 page.
Abstract of Japanese Patent—JP2009108180A, May 21, 2009, 1 page.
Abstract of Japanese Patent—JP2010174114A, Aug. 12, 2010, 1 page.
Abstract of Taiwanese Patent—TW397859B, Jul. 11, 2000, 1 page.
Nair et al., U.S. Appl. No. 13/594,919, filed Aug. 27, 2012, Melt-Extruded Substrate for Use in Thermoformed Articles.
Grenci et al., U.S. Appl. No. 13/594,920, filed Aug. 27, 2012, Liquid Crystalline Polymer Composition Containing a Fibrous Filler.
Nair et al., U.S. Appl. No. 13/594,923, filed Aug. 27, 2012, Cast Molded Parts Formed from a Liquid Crystalline Polymer.
Abstract of German Patent—DE2041773, 1972, 1 page.
Abstract of German Patent—DE4017685, Dec. 5, 1991, 1 page.
Abstract of European Patent—EP0523326, Jan. 20, 1993, 1 page.
Abstract of Japanese Patent—JPS5893718, Jun. 3, 1983, 2 pages.
Abstract of Japanese Patent—JPS5861145, Apr. 12, 1983, 1 page.

(56) References Cited

OTHER PUBLICATIONS

Abstract of Japanese Patent—JPS5861146, Apr. 12, 1983, 1 pages.
Abstract of Japanese Patent—JPS5883048, May 18, 1983, 2 pages.
Abstract of Japanese Patent—JPS58219233, Dec. 20, 1983, 2 pages.
Abstract of Japanese Patent—JPS59196364, Nov. 7, 1984, 1 page.
Abstract of Japanese Patent—JPS6049026, Mar. 18, 1984, 2 pages.
Abstract of Japanese Patent—JPS63137950, Jun. 9, 1988, 1 page.
Abstract of Japanese Patent—JPS63280730, Nov. 17, 1988, 2 pages.
Abstract of Japanese Patent—JPS63280731, Nov. 17, 1998, 1 page.
Abstract of Japanese Patent—JPS63280732, Nov. 17, 1988, 2 pages.
Abstract of Japanese Patent—JPH01115926, May 09, 1989, 1 page.
Abstract of Japanese Patent—JPH02151626, Jun. 11, 1990, 1 page.
Abstract of Japanese Patent—JPH02240134, Sep. 25, 1990, 1 page.
Abstract of Japanese Patent—JPH02240138, Sep. 25, 1990, 1 page.
Abstract of Japanese Patent—JPH03072559, Mar. 27, 1991, 1 page.
Abstract of Japanese Patent—JPH03095260, Apr. 19, 1991, 2 pages.
Abstract of Japanese Patent—JPH0673239, Mar. 15, 1994, 1 page.
Abstract of Japanese Patent—JP2006225644, Aug. 31, 2006, 1 page.
Abstract of Japanese Patent—JP2006257047, Sep. 28, 2006, 1 page.
Abstract of Polish Patent—PL92807, 1977, 1 page.
Article—Han et al., "A Change in Mechanism from Acidolysis to Phenolysis in the Bulk Copolymerization of 4-Acetoxybenzoic Acid and 6-Acetoxy-2-naphthoic Acid," *Macromolecules*, 1996, vol. 29, No. 26, pp. 8313-8320.
Article—Gale et al., "Conformational Control of Selectivity and Stability in Hybrid Amide/Urea Macrocycles," *Chem. Eur. J.*, vol. 13, 2007, pp. 3320-3329.
Abstract of Article—Ueda et al., "Diphenyl (2,3-Dihydro-2-thioxo-3-benzoxazolyl)phosphonate: A New, Reactive Activating Agent for the Synthesis of Amides and Polyamides," *Macromolecules*, vol. 21, No. 1, 1988, pp. 19-24.
Article—Washio et al., "Facile Synthesis of Polyamide Dendrimers from Unprotected $AB_2$ Building Blocks: Dumbbell-Shaped Dendrimer, Star-Shaped Dendrimer, and Dendrimer with a Carboxylic Acid at the Core," *Macromolecules*, vol. 38, No. 6, 2005, pp. 2237-2246.
Article—Kuz'min et al., "Kinetics of Acylation of Anilines Monosubstituted in the Ring by Benzoyl Chloride in N,N-Dimethylacetamide," *Zhurnal Organicheskoi Khimii*, vol. 17, No. 11, pp. 2394-2396, 1982.
Abstract of Article—Shaul M. Aharoni, "Hydrogen-Bonded Highly Regular Strictly Alternating Aliphatic-Aromatic Liquid Crystalline Poly(ester amides)," *Macromolecules*, Vo. 21, 1988, pp. 1941-1961.
Article—Li et al., "Modification of rheological properties of a thermotropic liquid crystalline polymer by melt-state reactive processing," *Polymer*, 2012, pp. 1-8.
Article—Shaul M. Aharoni, "Monodisperse Rodlike Oligomers and Their Mesomorphic Higher Molecular Weight Homologues," *Macromolecules*, vol. 20, No. 8, 1987, pp. 2010-2017.
Article—Siegmann et al., "Polyblends containing a liquid crystalline polymer," *Polymer*, 1985, vol. 26, August (conference issue), pp. 1325-1330.
Article—Dutta et al., "Polymer Blends Containing Liquid Crystals: A Review," *Polymer Engineering and Science*, Mid-Sep. 1990, vol. 30, No. 17, pp. 1005-1018.
Article—Oswal et al., "Synthesis and Characterization of Linear Aromatic Polyester-amides from Diacid Chlorides and Aminophenols," *Iranian Polymer Journal*, vol. 13, No. 3, 2004, pp. 205-212.
Abstract of Article—Preston et al., "Synthesis of high-molecular-weight rodlike polyamides and block copolymers," *Journal of Polymer Science: Polymer Chemistry Edition*, vol. 20, Issue 11, Nov. 1982, pp. 3241-3249.
Abstract of Article—Kajiyama et al., "Synthesis and properties of multiblock copolymers based on polydimethylsiloxane and piperazine-aromatic polyamides," *Journal of Applied Polymer Science*, vol. 39, Issue 8, Apr. 1990, pp. 1699-1708.
Abstract of Article—Ueda et al., "Synthesis of Sequential Polyamide by Direct Polycondensation," *Polymer Journal*, vol. 23, No. 3, 1991, pp. 167-176.
Article—Quamara et al., "Thermally stimulated depolarization current Investigations of copolyesteramide (Vectra B 950) polymer liquid crystal," *Materials Science-Poland*, vol. 28, No. 3, 2010, pp. 679-691.
Paper—Olena Rudko, "Liquid crystalline polymers. Uniaxial-biaxial nematic phase transition," *Term Paper for Physics 498, Emergent States of Matter*, May 6, 2002, pp. 112 (Department of Physics, University of Illinois at Urbana-Champaign).
Abstract of Article and Article—Ishida et al., "Unusual Thermal Behavior of the Aromatic Polyamide Dendrons," *Kobunshi Ronbunshu*, vol. 57, No. 12, Dec. 2000, pp. 825-829.
Search Report and Written Opinion for PCT/US2012/052447 dated Jan. 23, 2013, 11 pages.
Abstract of Japanese Patent—JPS63250353, Oct. 18, 1988, 2 pages.
Abstract of Japanese Patent—JP2010180374, Aug. 19, 2010, 1 page.
Chinese Search Report dated Mar. 25, 2015, 2 pages.

\* cited by examiner

HIGH FLOW LIQUID CRYSTALLINE POLYMER COMPOSITION

RELATED APPLICATIONS

The present application claims priority to U.S. provisional application Ser. Nos. 61/528,383, filed on Aug. 29, 2011, and 61/664,811, filed on Jun. 27, 2012, which are incorporated herein in their entirety by reference thereto.

BACKGROUND OF THE INVENTION

Electrical components (e.g., fine pitch connectors) are commonly produced from thermotropic liquid crystalline polymers ("LCPs"). One benefit of such polymers is that they can exhibit a relatively high "flow", which refers to the ability of the polymer when heated under shear to uniformly fill complex parts at fast rates without excessive flashing or other detrimental processing issues. In addition to enabling complex part geometries, high polymer flow can also enhance the ultimate performance of the molded component. Most-notably, parts generated from well-flowing polymers generally display improved dimensional stability owing to the lower molded-in stress, which makes the component more amenable to downstream thermal processes that can be negatively impacted from warpage and other polymer stress relaxation processes that occur in less well-molded materials.

Despite their relatively high flow capacity, current commercial LCPs still fall short of what is needed to meet the increased molding demands of intricate part designs without significant compromises to the final product performance. In this regard, various attempts have been made to improve the flow properties of conventional properties by lowering its melt viscosity. One approach to a lower melt viscosity has involved reducing the molecular weight of the polymer. However in general, decreased molecular weight polymers display reduced thermal and mechanical properties as well as poorer blister performance during lead-free soldering and other fabrication processes. Other approaches have also been employed that involve the addition of certain compounds to the polymer during compounding. For example, one approach employs the use of an oligomeric additive that may have carboxyl and hydroxy terminal groups. Such additives, however, particularly when used in relatively high amounts, can result in the formation of volatile products due to their decomposition during melt processing and/or use. This may, in turn, lead to the formation of blisters that can adversely impact the thermal and mechanical properties of the polymer and thus limit its use in certain applications.

As such, a need continues to exist for high flow liquid thermotropic crystalline polymers with excellent thermo-mechanical properties.

SUMMARY OF THE INVENTION

In accordance with one embodiment of the present invention, a thermotropic liquid crystalline polymer composition is disclosed that comprises a liquid crystalline polymer and an aromatic amide oligomer having the following general formula (I):

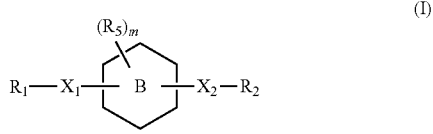

(I)

wherein,
ring B is a 6-membered aromatic ring wherein 1 to 3 ring carbon atoms are optionally replaced by nitrogen or oxygen, wherein each nitrogen is optionally oxidized, and wherein ring B may be optionally fused or linked to a 5- or 6-membered aryl, heteroaryl, cycloalkyl, or heterocyclyl;
$R_5$ is halo, haloalkyl, alkyl, alkenyl, aryl, heteroaryl, cycloalkyl, or heterocyclyl;
m is from 0 to 4;
$X_1$ and $X_2$ are independently C(O)HN or NHC(O); and
$R_1$ and $R_2$ are independently selected from aryl, heteroaryl, cycloalkyl, and heterocyclyl.

Other features and aspects of the present invention are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which.

DETAILED DESCRIPTION OF REPRESENTATIVE EMBODIMENTS

Definitions

Figure 1:
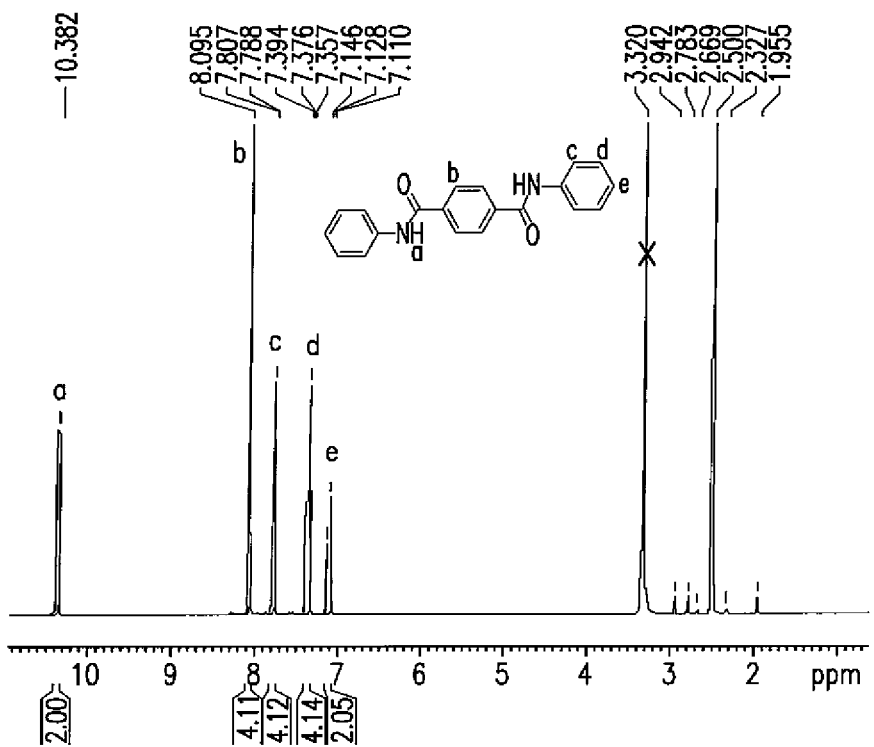
FIG. 1 is the Proton NMR characterization for N1,N4-diphenylterephthalamide (Compound A)

It is to be understood that the terminology used herein is for the purpose of describing particular embodiments only and is not intended to limit the scope of the present invention.

"Alkyl" refers to monovalent saturated aliphatic hydrocarbyl groups having from 1 to 10 carbon atoms and, in some embodiments, from 1 to 6 carbon atoms. "$C_{x-y}$alkyl" refers to alkyl groups having from x to y carbon atoms. This term includes, by way of example, linear and branched hydrocarbyl groups such as methyl ($CH_3$), ethyl ($CH_3CH_2$), n-propyl ($CH_3CH_2CH_2$), isopropyl (($CH_3)_2CH$), n-butyl ($CH_3CH_2CH2CH_2$), isobutyl (($CH_3)_2CHCH_2$), sec-butyl (($CH_3)(CH_3CH_2)CH$), t-butyl (($CH_3)_3C$), n-pentyl ($CH_3CH_2CH_2CH_2CH_2$), and neopentyl (($CH_3)_3CCH_2$).

"Alkenyl" refers to a linear or branched hydrocarbyl group having from 2 to 10 carbon atoms and in some embodiments from 2 to 6 carbon atoms or 2 to 4 carbon atoms and having at least 1 site of vinyl unsaturation ($>C=C<$). For example, ($C_x$-$C_y$)alkenyl refers to alkenyl groups having from x to y carbon atoms and is meant to include for example, ethenyl, propenyl, 1,3-butadienyl, and so forth.

"Alkynyl" refers to refers to a linear or branched monovalent hydrocarbon radical containing at least one triple bond. The term "alkynyl" may also include those hydrocarbyl groups having other types of bonds, such as a double bond and a triple bond.

"Aryl" refers to an aromatic group of from 3 to 14 carbon atoms and no ring heteroatoms and having a single ring (e.g., phenyl) or multiple condensed (fused) rings (e.g., naphthyl or anthryl). For multiple ring systems, including fused, bridged, and spiro ring systems having aromatic and non-aromatic rings that have no ring heteroatoms, the term "Aryl" applies when the point of attachment is at an aromatic carbon atom (e.g., 5,6,7,8 tetrahydronaphthalene-2-yl is an aryl group as its point of attachment is at the 2-position of the aromatic phenyl ring).

"Cycloalkyl" refers to a saturated or partially saturated cyclic group of from 3 to 14 carbon atoms and no ring heteroatoms and having a single ring or multiple rings including fused, bridged, and spiro ring systems. For multiple ring systems having aromatic and non-aromatic rings that have no ring heteroatoms, the term "cycloalkyl" applies when the point of attachment is at a non-aromatic carbon atom (e.g. 5,6,7,8,-tetrahydronaphthalene-5-yl). The term "cycloalkyl" includes cycloalkenyl groups, such as adamantyl, cyclopropyl, cyclobutyl, cyclopentyl, cyclooctyl, and cyclohexenyl. The term "cycloalkenyl" is sometimes employed to refer to a partially saturated cycloalkyl ring having at least one site of >C=C< ring unsaturation.

"Halo" or "halogen" refers to fluoro, chloro, bromo, and iodo.

"Haloalkyl" refers to substitution of alkyl groups with 1 to 5 or in some embodiments 1 to 3 halo groups.

"Heteroaryl" refers to an aromatic group of from 1 to 14 carbon atoms and 1 to 6 heteroatoms selected from oxygen, nitrogen, and sulfur and includes single ring (e.g. imidazolyl) and multiple ring systems (e.g. benzimidazol-2-yl and benzimidazol-6-yl). For multiple ring systems, including fused, bridged, and spiro ring systems having aromatic and non-aromatic rings, the term "heteroaryl" applies if there is at least one ring heteroatom and the point of attachment is at an atom of an aromatic ring (e.g. 1,2,3,4-tetrahydroquinolin-6-yl and 5,6,7,8-tetrahydroquinolin-3-yl). In some embodiments, the nitrogen and/or the sulfur ring atom(s) of the heteroaryl group are optionally oxidized to provide for the N oxide (N→O) sulfinyl, or sulfonyl moieties. Examples of heteroaryl groups include, but are not limited to, pyridyl, furanyl, thienyl, thiazolyl, isothiazolyl, triazolyl, imidazolyl, imidazolinyl, isoxazolyl, pyrrolyl, pyrazolyl, pyridazinyl, pyrimidinyl, purinyl, phthalazyl, naphthylpryidyl, benzofuranyl, tetrahydrobenzofuranyl, isobenzofuranyl, benzothiazolyl, benzoisothiazolyl, benzotriazolyl, indolyl, isoindolyl, indolizinyl, dihydroindolyl, indazolyl, indolinyl, benzoxazolyl, quinolyl, isoquinolyl, quinolizyl, quianazolyl, quinoxalyl, tetrahydroquinolinyl, isoquinolyl, quinazolinonyl, benzimidazolyl, benzisoxazolyl, benzothienyl, benzopyridazinyl, pteridinyl, carbazolyl, carbolinyl, phenanthridinyl, acridinyl, phenanthrolinyl, phenazinyl, phenoxazinyl, phenothiazinyl, and phthalimidyl.

"Heterocyclic" or "heterocycle" or "heterocycloalkyl" or "heterocyclyl" refers to a saturated or partially saturated cyclic group having from 1 to 14 carbon atoms and from 1 to 6 heteroatoms selected from nitrogen, sulfur, or oxygen and includes single ring and multiple ring systems including fused, bridged, and spiro ring systems. For multiple ring systems having aromatic and/or non-aromatic rings, the terms "heterocyclic", "heterocycle", "heterocycloalkyl", or "heterocyclyl" apply when there is at least one ring heteroatom and the point of attachment is at an atom of a non-aromatic ring (e.g. decahydroquinolin-6-yl). In some embodiments, the nitrogen and/or sulfur atom(s) of the heterocyclic group are optionally oxidized to provide for the N oxide, sulfinyl, sulfonyl moieties. Examples of heterocyclyl groups include, but are not limited to, azetidinyl, tetrahydropyranyl, piperidinyl, N-methylpiperidin-3-yl, piperazinyl, N-methylpyrrolidin-3-yl, 3-pyrrolidinyl, 2-pyrrolidon-1-yl, morpholinyl, thiomorpholinyl, imidazolidinyl, and pyrrolidinyl.

It should be understood that the aforementioned definitions encompass unsubstituted groups, as well as groups substituted with one or more other functional groups as is known in the art. For example, an aryl, heteroaryl, cycloalkyl, or heterocyclyl group may be substituted with from 1 to 8, in some embodiments from 1 to 5, in some embodiments from 1 to 3, and in some embodiments, from 1 to 2 substituents selected from alkyl, alkenyl, alkynyl, alkoxy, acyl, acylamino, acyloxy, amino, quaternary amino, amide, imino, amidino, aminocarbonylamino, amidinocarbonylamino, aminothiocarbonyl, aminocarbonylamino, aminothiocarbonylamino, aminocarbonyloxy, aminosulfonyl, aminosulfonyloxy, aminosulfonylamino, aryl, aryloxy, arylthio, azido, carboxyl, carboxyl ester, (carboxyl ester)amino, (carboxyl ester)oxy, cyano, cycloalkyl, cycloalkyloxy, cycloalkylthio, guanidino, halo, haloalkyl, haloalkoxy, hydroxy, hydroxyamino, alkoxyamino, hydrazino, heteroaryl, heteroaryloxy, heteroarylthio, heterocyclyl, heterocyclyloxy, heterocyclylthio, nitro, oxo, thione, phosphate, phosphonate, phosphinate, phosphonamidate, phosphorodiamidate, phosphoramidate monoester, cyclic phosphoramidate, cyclic phosphorodiamidate, phosphoramidate diester, sulfate, sulfonate, sulfonyl, substituted sulfonyl, sulfonyloxy, thioacyl, thiocyanate, thiol, alkylthio, etc., as well as combinations of such substituents.

"Liquid crystalline polymer" or "liquid crystal polymer" refers to a polymer that can possess a rod-like structure that allows it to exhibit liquid crystalline behavior in its molten state (e.g., thermotropic nematic state). The polymer may contain aromatic units (e.g., aromatic polyesters, aromatic polyesteramides, etc.) so that it is wholly aromatic (e.g., containing only aromatic units) or partially aromatic (e.g., containing aromatic units and other units, such as cycloaliphatic units). The polymer may also be fully crystalline or semi-crystalline in nature.

Detailed Description

It is to be understood by one of ordinary skill in the art that the present discussion is a description of exemplary embodiments only, and is not intended as limiting the broader aspects of the present invention.

Generally speaking, the present invention is directed to a liquid crystalline polymer composition that contains a thermotropic liquid crystalline polymer and an aromatic amide oligomer that can serve as a flow aid by altering intermolecular polymer chain interactions, thereby lowering the overall viscosity of the polymer matrix under shear. In addition to simply reducing viscosity, the present inventors have also discovered that the oligomer is not easily volatized or decomposed during compounding, molding, and/or use. This minimizes off-gassing and the formation of blisters that would otherwise impact the final mechanical properties of a part made from the polymer composition. Without intending to be limited by theory, it is believed that active hydrogen atoms of the amide functional groups are capable of forming a hydrogen bond with the backbone of liquid crystalline polyesters or polyesteramides. Such hydrogen bonding strengthens the attachment of the oligomer to the liquid crystalline polymer matrix and thus minimizes the likelihood that it becomes volatilized during formation. While providing the benefits noted, the aromatic amide oligomer does not generally react with the polymer backbone of the liquid crystalline polymer to any appreciable extent so that the mechanical properties of the polymer are not adversely impacted.

The aromatic amide oligomer generally has a relatively low molecular weight so that it can effectively serve as a flow aid for the polymer composition. For example, the oligomer typically has a molecular weight of about 2,000 grams per mole or less, in some embodiments from about 50 to about 1,000 grams per mole, in some embodiments from about 100 to about 800 grams per mole, and in some embodiments, from about 200 to about 600 grams per mole. In addition to possessing a relatively low molecular weight, the oligomer also generally possesses a high amide functionality so it is capable of undergoing a sufficient degree of hydrogen bonding with the liquid crystalline polymer. The degree of amide functionality for a given molecule may be characterized by its "amide equivalent weight", which reflects the amount of a compound that contains one molecule of an amide functional group and may be calculated by dividing the molecular weight of the compound by the number of amide groups in the molecule. For example, the aromatic amide oligomer may contain from 1 to 10, in some embodiments from 2 to 8, and in some embodiments, from 2 to 4 amide functional groups per molecule. The amide equivalent weight may likewise be from about 10 to about 1,000 grams per mole or less, in some embodiments from about 50 to about 500 grams per mole, and in some embodiments, from about 100 to about 300 grams per mole.

As indicated above, it is desirable that the amide oligomer functionality is also generally unreactive so that it does not form covalent bonds with the liquid crystalline polymer backbone. To help better minimize reactivity, the oligomer typically contains a core formed from one or more aromatic rings (including heteroaromatic). The oligomer may also contain terminal groups formed from one or more aromatic rings and/or cycloalkyl groups. Such an "aromatic" oligomer thus possesses little, if any, reactivity with the base liquid crystalline polymer. For example, the aromatic amide oligomer may have the general Formula (I):

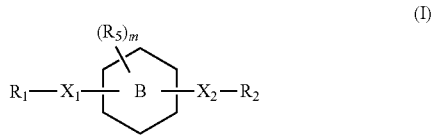

wherein, ring B is a 6-membered aromatic ring wherein 1 to 3 ring carbon atoms are optionally replaced by nitrogen or oxygen, wherein each nitrogen is optionally oxidized, and wherein ring B may be optionally fused or linked to a 5- or 6-membered aryl, heteroaryl, cycloalkyl, or heterocyclyl;

$R_5$ is halo, haloalkyl, alkyl, alkenyl, aryl, heteroaryl, cycloalkyl, or heterocyclyl;

m is from 0 to 4;

$X_1$ and $X_2$ are independently C(O)HN or NHC(O);

$R_1$ and $R_2$ are independently selected from aryl, heteroaryl, cycloalkyl, and heterocyclyl.

In certain embodiments, Ring B may be selected from the following:

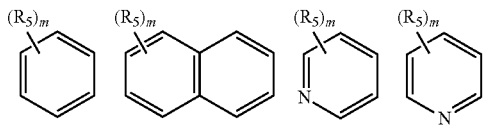

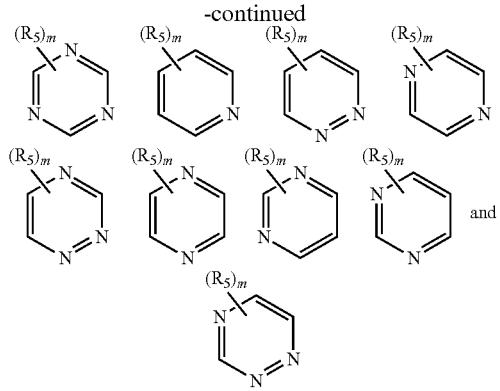

wherein, m is 0, 1, 2, 3, or 4, in some embodiments m is 0, 1, or 2, in some embodiments m is 0 or 1, and in some embodiments, m is 0; and $R_5$ is halo, haloalkyl, alkyl, alkenyl, aryl, heteroaryl, cycloalkyl, or heterocyclyl. Ring B may be phenyl.

In some embodiments, $R_1$ may be selected from the following:

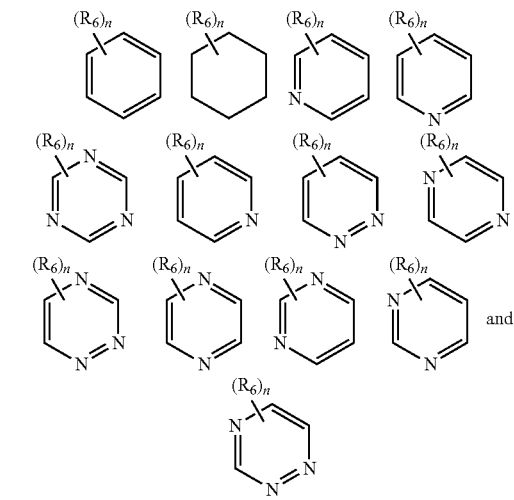

wherein, n is 0, 1, 2, 3, or 4, in some embodiments n is 0, 1, or 2, and in some embodiments, n is 0 or 1; and $R_6$ is halo, haloalkyl, alkyl, alkenyl, alkynyl, aryl, heteroaryl, cycloalkyl, or heterocyclyl.

$R_2$ may likewise be selected from the following:

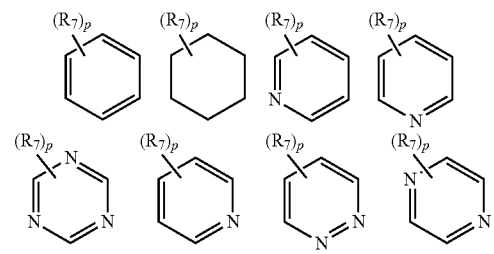

-continued

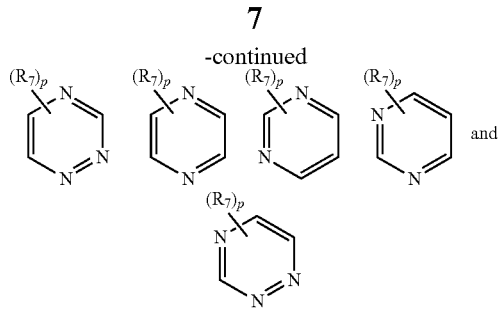

and wherein, p is 0, 1, 2, 3, or 4, in some embodiments n is 0, 1, or 2, and in some embodiments, n is 0 or 1; and $R_7$ is halo, haloalkyl, alkyl, alkenyl, alkynyl, aryl, heteroaryl, cycloalkyl, or heterocyclyl.

In one particular embodiment, the aromatic amide oligomer has the following general formula (II):

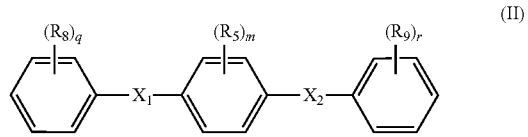

(II)

wherein, $X_1$ and $X_2$ are independently C(O)HN or NHC(O);

$R_5$, $R_8$, and $R_9$ are independently selected from halo, haloalkyl, alkyl, alkenyl, alkynyl, aryl, heteroaryl, cycloalkyl, and heterocyclyl;

m is from 0 to 4; and q and r are independently from 0 to 5.

In another embodiment, the aromatic amide oligomer has the following general formula (III):

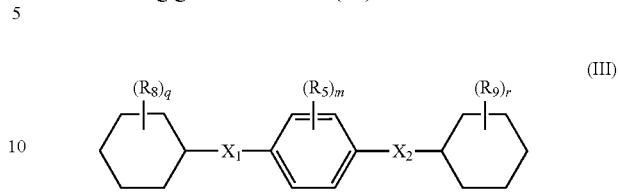

(III)

wherein, $X_1$, $X_2$, $R_5$, $R_8$, $R_9$, m, q, and r are as defined above.

For example, in certain embodiments, m, q and r in Formula (II) and Formula (III) may be equal to 0 so that the core and terminal aromatic groups are unsubstituted. In other embodiments, m may be 0 and q and r may be from 1 to 5. In such embodiments, for example, $R_8$ and/or $R_9$ may be halo (e.g., fluorine). In other embodiments, $R_8$ and/or $R_9$ may be aryl (e.g., phenyl), cycloalkyl (e.g., cyclohexyl), or aryl and/or cycloalkyl substituted with an amide group having the structure: —C(O)$R_{12}$N— or —N$R_{13}$C(O)—, wherein $R_{12}$ and $R_{13}$ are independently selected from hydrogen, alkyl, alkenyl, alkynyl, aryl, heteroaryl, cycloalkyl, and heterocyclyl. In one particular embodiment, for example, $R_8$ and/or $R_9$ are phenyl substituted with —C(O)HN— or —NHC(O)—. In yet other embodiments, $R_8$ and/or $R_9$ may be heteroaryl (e.g., pyridinyl).

Specific embodiments of the aromatic amide oligomer of the present invention are also set forth in the table below:

| Cmpd # | Structure | Name |
|---|---|---|
| A | | N1,N4-diphenylterephthalamide |
| B | | N1,N4-diphenylisoterephthalamide |
| C | | N1,N4-bis(2,3,4,5,6-pentafluorophenyl)terephthalamide |

-continued

| Cmpd # | Structure | Name |
| --- | --- | --- |
| D | | N1,N4-bis(4-benzamidophenyl)terephthalamide |
| E | | N4-phenyl-N1-[4-[[4-(phenylcarbamoyl)benzoyl]amino]phenyl]terephthalamide |
| F1 | | N4-phenyl-N1-[3-[[4-(phenylcarbamoyl)benzoyl]amino]phenyl]terephthalamide |
| F2 | | N1,N3-bis(4-benzamidophenyl)benzene-1,3-dicarboxamide |
| G1 | | N3-phenyl-N1-[3-[[3-(phenylcarbamoyl)benzoyl]amino]phenyl]benzene-1,3-dicarboxamide |

-continued

| Cmpd # | Structure | Name |
| --- | --- | --- |
| G2 | | N1,N3-bis(3-benzamidophenyl)benzene-1,3-dicarboxamide |
| H | | N1,N4-bis(4-pyridyl)terephthalamide |
| I | | N1,N3-bis(4-phenylphenyl)benzene-1,3-dicarboxamide |
| J1 | | N2,N7-dicyclohexylnaphthalene-2,7-dicarboxamide |
| J2 | | N2,N6-dicyclohexylnaphthalene-2,6-dicarboxamide |
| K1 | | 1,3-Benzenedicarboxamide, N1,N3-dicyclohexyl |
| K2 | | 1,4-Benzenedicarboxamide, N1,N3-dicyclohexyl. |

Generally speaking, the aromatic amide oligomer of the present invention may be employed in conjunction with any of a variety of known thermotropic liquid crystalline polymers. Suitable liquid crystalline polymers are generally condensation polymers that have relatively rigid and linear polymer chains so that they melt to form a liquid crystalline phase. Examples of such polymers may include, for instance, polyesters, poly(esteramides), poly(estercarbonates), polyamides, etc. Such polymers may, for example, contain repeating units formed from one or more aromatic or aliphatic hydroxycarboxylic acids, aromatic or aliphatic dicarboxylic acids, aromatic or aliphatic dials, aromatic or aliphatic aminocarboxylic acids, aromatic or aliphatic amines, aromatic or aliphatic diamines, etc., as well as combinations thereof.

For example, aromatic polyesters can be obtained by polymerizing (1) two or more aromatic hydroxycarboxylic acids; (2) at least one aromatic hydroxycarboxylic acid, at least one aromatic dicarboxylic acid, and at least one aromatic diol; and/or (3) at least one aromatic dicarboxylic acid and at least one aromatic dial. Examples of suitable aromatic hydroxycarboxylic acids include, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof. Examples of suitable aromatic dicarboxylic acids include terephthalic acid; isophthalic acid; 2,6-naphthalenedicarboxylic acid; diphenyl ether-4,4'-dicarboxylic acid; 1,6-naphthalenedicarboxylic acid; 2,7-naphthaienedicarboxylic acid; 4,4'-dicarboxybiphenyl; bis(4-carboxyphenyl)ether; bis(4-carboxyphenyl)butane; bis(4-carboxyphenyl)ethane; bis(3-carboxyphenyl)ether; bis(3-carboxyphenyl)ethane, etc., as well as alkyl, alkoxy, aryl and halogen substituents thereof. Examples of suitable aromatic diols include hydroquinone; resorcinol; 2,6-dihydroxynaphthalene; 2,7-dihydroxynaphthalene; 1,6-dihydroxynaphthalene; 4,4'-dihydroxybiphenyl; 3,3'-dihydroxybiphenyl; 3,4'-dihydroxybiphenyl; 4,4'-dihydroxybiphenyl ether; bis(4-hydroxyphenyl)ethane, etc., as well as alkyl, alkoxy, aryl and halogen substituents thereof. In one particular embodiment, the aromatic polyester contains monomer repeat units derived from 4-hydroxybenzoic acid and 2,6-hydroxynaphthoic acid. The monomer units derived from 4-hydroxybenzoic acid may constitute from about 45% to about 85% (e.g., 73%) of the polymer on a mole basis and the monomer units derived from 2,6-hydroxynaphthoic acid may constitute from about 15% to about 55% (e.g., 27%) of the polymer on a mole basis. Such aromatic polyesters are commercially available from Ticona, LLC under the trade designation VECTRA® A. The synthesis and structure of these and other aromatic polyesters may be described in more detail in U.S. Pat. Nos. 4,161,470; 4,473,682; 4,522,974; 4,375,530; 4,318,841; 4,256,624; 4,219,461; 4,083,829; 4,184,996; 4,279,803; 4,337,190; 4,355,134; 4,429,105; 4,393,191; 4,421,908; 4,434,262; and 5,541,240.

Liquid crystalline polyesteramides may also include those obtained by polymerizing (1) at least one aromatic hydroxycarboxylic acid and at least one aromatic aminocarboxylic acid; (2) at least one aromatic hydroxycarboxylic acid, at least one aromatic dicarboxylic acid, and at least one aromatic amine and/or diamine optionally having phenolic hydroxy groups; and (3) at least one aromatic dicarboxylic acid and at least one aromatic amine and/or diamine optionally having phenolic hydroxy groups. Suitable aromatic amines and diamines may include, for instance, 3-aminophenol; 4-aminophenol; 1,4-phenylenediamine; 1,3-phenylenediamine, etc., as well as alkyl, alkoxy, aryl and halogen substituents thereof. In one particular embodiment, the aromatic polyesteramide contains monomer units derived from 2,6-hydroxynaphthoic acid, terephthalic acid, and 4-aminophenol. The monomer units derived from 2,6-hydroxynaphthoic acid may constitute from about 35% to about 85% of the polymer on a mole basis (e.g., 60%), the monomer units derived from terephthalic acid may constitute from about 5% to about 50% (e.g., 20%) of the polymer on a mole basis, and the monomer units derived from 4-aminophenol may constitute from about 5% to about 50% (e.g., 20%) of the polymer on a mole basis. Such aromatic polyesters are commercially available from Ticona, LLC under the trade designation VECTRA® B. In another embodiment, the aromatic polyesteramide contains monomer units derived from 2,6-hydroxynaphthoic acid, and 4-hydroxybenzoic acid, and 4-aminophenol, as well as other optional monomers (e.g., 4,4'-dihydroxybiphenyl and/or terephthalic acid). The synthesis and structure of these and other aromatic poly(esteramides) may be described in more detail in U.S. Pat. Nos. 4,339,375; 4,355,132; 4,351,917; 4,330,457; 4,351,918; and 5,204,443.

Regardless of their particular monomeric constituents, the liquid crystalline polymers may be prepared using a variety of known polymerization processes. For example, the monomer(s) (e.g., aromatic hydroxycarboxylic acid, aromatic dicarboxylic acid, aromatic diol, aromatic amine, aromatic diamine, etc.) may be introduced into a reactor and heated to initiate a polycondensation reaction. If desired, the reaction may also proceed through the acetylation of the monomers as is known in the art. For instance, one suitable polymerization technique may include charging the monomers into a reactor, adding acetic anhydride to acetylize a hydroxyl group of the monomers, and then carrying out an acetic acid-removing polycondensation reaction. For example, an aromatic polyester may be produced by charging 4-hydroxybenzoic acid and 2,6-hydroxynaphthoic acid into a reactor under a nitrogen atmosphere, adding acetic anhydride to form an acetoxy under acetic anhydride reflux, then increasing the temperature to carry out acetic acid-removing melt polycondensation while distilling off the acetic acid in a temperature range of 150 to 350° C. If desired, a catalyst can optionally be used in the polymerization reaction, such as metal salt catalysts (e.g., magnesium acetate, tin(I) acetate, tetrabutyl titanate, lead acetate, sodium acetate, potassium acetate, etc.) and organic compound catalysts (e.g., N-methylimidazole). Such catalysts are typically used in amounts of from about 50 to about 500 parts per million based on the total weight of the recurring unit precursors. The particular conditions and steps employed in such reactions are well known, and may be described in more detail in U.S. Pat. No. 4,161,470 to Calundann and U.S. Pat. No. 6,514,611 to Shepherd, et al.

Polymerization may be carried by melt polymerization or a two-step polymerization method that includes melt polymerization and solid phase polymerization. When carrying out solid-phase polymerization on a polymer obtained by melt polymerization, it is typically desired to select a method in which the polymer obtained by melt polymerization is solidified and then pulverized to form a powdery or flake-like polymer, followed by performing solid polymerization method, such as a heat treatment in a temperature range of 200 to 350° C. under an inert atmosphere (e.g., nitrogen). The solid-phase polymerization may be carried out while stirring or in a still state without any stirring. The polymerization reaction apparatus is not especially limited, although it is typically desired to employ one that is commonly used in reactions of high viscosity fluids. Examples of such a reaction apparatus may include a stirring tank type polymerization reaction apparatus having a stirring device that has a variously shaped stirring blade, such as an anchor type, a multistage type, a spiral-ribbon type, a screw shaft type and the like, or a modified shape thereof. Further examples of such a reaction apparatus include a mixing apparatus commonly used in resin kneading, such as a kneader, a roll mill, a Banbury mixer, etc. Following polymerization, the molten polymer may be discharged from the reactor, typically through an extrusion orifice fitted with a die of desired configuration, cooled, and collected. Commonly, the melt is discharged through a perforated die to form strands that are taken up in a water bath, pelletized and dried. The resin may also be in the form of a strand, granule, or powder.

Regardless of the manner in which it is formed, the resulting liquid crystalline polymer typically has a number average molecular weight ($M_n$) of about 2,000 grams per mole or more, in some embodiments from about 4,000 grams per mole or more, and in some embodiments, from about 5,000 to about 30,000 grams per mole. To achieve such molecular weights, the addition of a small amount of an end-capping monomer unit or a slight imbalance in stoichiometry may be employed. For example, a small amount of terephthalic acid may sometimes be included in polymers derived from 2,6-hydroxynaphthoic acid and 4-hydroxybenzoic acid to achieve a molecular weight within the desired range. Of course, it is also possible to form polymers having a lower molecular weight, such as less than about 2,000 grams per mole, using the method of the present invention. The intrinsic viscosity of the polymer composition, which is generally proportional to molecular weight, may likewise be about 2 deciliters per gram ("dL/g") or more, in some embodiments about 3 dL/g or more, in some embodiments from about 4 to about 20 dL/g, and in some embodiments from about 5 to about 15 dL/g. Intrinsic viscosity may be determined in accordance with ISO-1628-5 using a 50/50 (v/v) mixture of pentafluorophenol and hexafluoroisopropanol, as described in more detail below.

The relative proportion of the liquid crystalline polymer and the aromatic amide oligomer in the composition may be selected to help achieve a balance between viscosity and mechanical properties. More particularly, high oligomer contents can result in low viscosity, but too high of a content may reduce the viscosity to such an extent that the oligomer adversely impacts the melt strength of the polymer blend. In most embodiments, for example, the aromatic amide oligomer, or mixtures thereof, may be employed in an amount of from about 0.1 to about 5 parts, in some embodiments from about 0.2 to about 4 parts, and in some embodiments, from about 0.3 to about 1.5 parts by weight relative to 100 parts by weight of the liquid crystalline polymer. The aromatic amide oligomers may, for example, constitute from about 0.1 wt. % to about 5 wt. %, in some embodiments from about 0.2 wt. % to about 4 wt. %, and in some embodiments, from about 0.3 wt. % to about 1.5 wt. % of the polymer composition. Liquid crystalline polymers may likewise constitute from about 95 wt. % to about 99.9 wt. %, in some embodiments from about 96 wt. % to about 98.8 wt. %, and in some embodiments, from about 98.5 wt. % to about 99.7 wt. % of the polymer composition.

The manner in which the oligomer and the liquid crystalline polymer are combined may vary as is known in the art. For instance, the raw materials may be supplied either simultaneously or in sequence to a melt processing device that dispersively blends the materials. Batch and/or continuous melt processing techniques may be employed. For example, a mixer/kneader, Banbury mixer, Farrel continuous mixer, single-screw extruder, twin-screw extruder, roll mill, etc., may be utilized to blend and melt process the materials. One particularly suitable melt processing device is a co-rotating, twin-screw extruder (e.g., Leistritz co-rotating fully intermeshing twin screw extruder). Such extruders may include feeding and venting ports and provide high intensity distributive and dispersive mixing. For example, the liquid crystalline polymer and oligomer may be fed to the same or different feeding ports of a twin-screw extruder and melt blended to form a substantially homogeneous melted mixture. Melt blending may occur under high shear/pressure and heat to ensure sufficient dispersion. For example, melt processing may occur at a temperature of from about 50° C. to about 500° C., and in some embodiments, from about 100° C. to about 250° C. Likewise, the apparent shear rate during melt processing may range from about 100 seconds$^{-1}$ to about 10,000 seconds$^{-1}$, and in some embodiments, from about 500 seconds$^{-1}$ to about 1,500 seconds$^{-1}$. Of course, other variables, such as the residence time during melt processing, which is inversely proportional to throughput rate, may also be controlled to achieve the desired degree of homogeneity.

Besides melt blending, other techniques may also be employed to combine the oligomer and the liquid crystalline polymer. For example, the oligomer may be supplied during one or more stages of the polymerization of the liquid crystalline polymer. For example, the aromatic amide oligomer may also be added to the polymerization apparatus. Although it may be introduced at any time, it is typically desired to apply the oligomer before melt polymerization has been initiated, and typically in conjunction with the precursor monomers for the liquid crystalline polymer. The reaction mixture is generally heated to an elevated temperature within the polymerization reactor vessel to initiate melt polycondensation of the reactants. Polycondensation may occur, for instance, within a temperature range of from about 210° C. to about 400° C., and in some embodiments, from about 250° C. to about 350° C. For instance, one suitable technique for forming an aromatic polyester may include charging precursor monomers (e.g., 4-hydroxybenzoic acid and 2,6-hydroxynaphthoic acid), aromatic amide oligomer, and acetic anhydride into the reactor, heating the mixture to a temperature of from about 90° C. to about 150° C. to acetylize a hydroxyl group of the monomers (e.g., forming acetoxy), and then increasing the temperature to a temperature of from about 210° C. to about 400° C. to carry out melt polycondensation. As the final polymerization temperatures are approached, volatile byproducts of the reaction (e.g., acetic acid) may also be removed so that the desired molecular weight may be readily achieved. The reaction mixture is generally subjected to agitation during polymerization to ensure good heat and mass transfer, and in turn, good material homogeneity. The rotational velocity of the agitator may vary during the course of the reaction, but typically ranges from about 10 to about 100 revolutions per minute ("rpm"), and in some embodiments, from about 20 to about 80 rpm. To build molecular weight in the melt, the polymerization reaction may also be conducted under vacuum, the application of which facilitates the removal of volatiles formed during the final stages of polycondensation. The vacuum may be created by the application of a suctional pressure, such as within the range of from about 5 to about 30 pounds per square inch ("psi"), and in some embodiments, from about 10 to about 20 psi. Following melt polymerization, the molten polymer may be discharged from the reactor, typically through an extrusion orifice fitted with a die of desired configuration, cooled, and collected. Commonly, the melt is discharged through a perforated die to form strands that are taken up in a water bath, pelletized and dried.

Regardless of the manner in which it is introduced, the aromatic amide oligomer may lower the melt viscosity of the resulting polymer composition. The melt viscosity may, for instance, be reduced so that the ratio of the starting liquid crystalline polymer viscosity to the blended composition viscosity is at least about 1.1, in some embodiments at least about 1.2, in some embodiments from about 1.5 to about 50, in some embodiments from about 2 to about 40, and in some embodiments, from about 4 to about 30. In one particular embodiment, the polymer composition may have a melt viscosity of from about 0.5 to about 100 Pa-s, in some embodiments from about 1 to about 80 Pa-s, and in some embodiments, from about 2 to about 50 Pa-s, determined at a shear rate of 1000 seconds$^{-1}$. Melt viscosity may be determined in accordance with ISO Test No. 11443 (equivalent to ASTM Test No. 1238-70) at a temperature of 350° C.

The melting point of the polymer composition may also range from about 250° C. to about 400° C., in some embodiments from about 270° C. to about 380° C., and in some embodiments, from about 300° C. to about 360° C. Likewise, the crystallization temperature may range from about 200° C. to about 400° C., in some embodiments from about 250° C. to about 350° C., and in some embodiments, from about 280° C. to about 320° C. The melting and crystallization temperatures may be determined as is well known in the art using differential scanning calorimetry ("DSC"), such as determined by ISO Test No. 11357.

If desired, the resulting polymer composition may also be combined with a wide variety of other types of components. For example, a filler material may be incorporated into the polymer composition to form a filled composition and to enhance strength. A filled polymer composition can include, for example, a mineral filler and/or a fiber filler optionally in conjunction with one or more other additives as are generally known in the art.

Fibers may be employed as a filler material to improve the mechanical properties. Such fibers generally have a high degree of tensile strength relative to their mass. For example, the ultimate tensile strength of the fibers (determined in accordance with ASTM D2101) is typically from about 1,000 to about 15,000 Megapascals ("MPa"), in some embodiments from about 2,000 MPa to about 10,000 MPa, and in some embodiments, from about 3,000 MPa to about 6,000 MPa. To help maintain an insulative property, which is often desirable for use in electronic components, the high strength fibers may be formed from materials that are also generally insulative in nature, such as glass, ceramics (e.g., alumina or silica), aramids (e.g., Kevlar® marketed by E. I. duPont de Nemours, Wilmington, Del.), polyolefins, polyesters, etc., as well as mixtures thereof. Glass fibers are particularly suitable, such as E-glass, A-glass, C-glass, D-glass, AR-glass, R-glass, S1-glass, S2-glass, etc., and mixtures thereof.

The volume average length of the fibers may be from about 50 to about 400 micrometers, in some embodiments from about 80 to about 250 micrometers, in some embodiments from about 100 to about 200 micrometers, and in some embodiments, from about 110 to about 180 micrometers. The fibers may also have a narrow length distribution. That is, at least about 70% by volume of the fibers, in some embodiments at least about 80% by volume of the fibers, and in some embodiments, at least about 90% by volume of the fibers have a length within the range of from about 50 to about 400 micrometers, in some embodiments from about 80 to about 250 micrometers, in some embodiments from about 100 to about 200 micrometers, and in some embodiments, from about 110 to about 180 micrometers. The fibers may also have a relatively high aspect ratio (average length divided by nominal diameter) to help improve the mechanical properties of the resulting polymer composition. For example, the fibers may have an aspect ratio of from about 2 to about 50, in some embodiments from about 4 to about 40, and in some embodiments, from about 5 to about 20 are particularly beneficial. The fibers may, for example, have a nominal diameter of about 10 to about 35 micrometers, and in some embodiments, from about 15 to about 30 micrometers.

The relative amount of the fibers in the filled polymer composition may also be selectively controlled to help achieve the desired mechanical properties without adversely impacting other properties of the composition, such as its flowability. For example, the fibers may constitute from about 2 wt. % to about 40 wt. %, in some embodiments from about 5 wt. % to about 35 wt. %, and in some embodiments, from about 6 wt. % to about 30 wt. % of the filled polymer composition. Although the fibers may be employed within the ranges noted above, small fiber contents may be employed while still achieving the desired mechanical properties. For example, the fibers can be employed in small amounts such as from about 2 wt. % to about 20 wt. %, in some embodiments, from about 5 wt. % to about 16 wt. %, and in some embodiments, from about 6 wt. % to about 12 wt. %.

When incorporating fibrous fillers into the composition, the fibers can be introduced to the composition at any time, though it is typically desired to introduce the fibers such that the fibers can be well dispersed and distributed throughout the composition. While not wishing to be bound to any particular theory, it is believed that dispersal and distribution of fibers throughout the composition can be enhanced when the polymer melt viscosity is relatively high. Accordingly, in one embodiment, fibers can be added to the composition prior to addition of the aromatic amide oligomer. For instance, a composition formation process can include feeding a liquid crystalline polymer to a melt processing unit, e.g., an extruder. A fibrous filler can be combined with the polymer to form a blend prior to addition of the aromatic amide oligomer, and the blend can be mixed under high shear as is known in the art to disperse and distribute the fibers throughout the molten polymer.

The fibers may generally be added at any location of the melt processing unit. In one embodiment, the fibers may be added at a location downstream from the point at which the liquid crystalline polymer is supplied, but yet prior to the melting section. In another embodiment, the fibers may be added at a location downstream from the point at which the liquid crystalline polymer becomes molten.

To help encourage dispersion and distribution of the fibers throughout the melt, a variety of different parameters may be selectively controlled. For example, the ratio of the length ("L") to diameter ("D") of a screw of the melt processing unit may be selected to achieve an optimum balance between throughput and fiber dispersion and distribution. For example, the L/D value after the point at which the fibers are supplied may be controlled to encourage dispersion and distribution of the fibers. More particularly, the screw can have a blending length ("$L_B$") that is defined from the point at which the fibers are supplied to the unit to the end of the screw, the blending length generally being less than the total length of the screw. In one embodiment, it may be desirable to add the fibers before the liquid crystalline polymer is melted, which means that the $L_B$/D ratio would be relatively high. However, too high of a $L_B$/D ratio could result in degradation of the polymer. Therefore, the $L_B$/D ratio of the screw after the point at which the fibers are supplied is typically from about 3 to about 20, in some embodiments from about 4 to about 18, and in some embodiments, from about 5 to about 16.

If desired, one or more distributive and/or dispersive mixing elements may be employed within the mixing section of the melt processing unit. Suitable distributive mixers for single screw extruders may include, for instance, Saxon, Dulmage, Cavity Transfer mixers, etc. Likewise, suitable dispersive mixers may include Blister ring, Leroy/Maddock, CRD mixers, etc. As is well known in the art, the mixing may be further improved by using pins in the barrel that create a folding and reorientation of the polymer melt, such as those used in Buss Kneader extruders, Cavity Transfer mixers, and Vortex Intermeshing Pin mixers.

After thorough mixing of the polymer and the fiber, the aromatic amide oligomer can be added to the melt processing unit, and the composition can again be thoroughly mixed to distribute the aromatic amide oligomer throughout the composition. For instance, the aromatic amide oligomer may be added following the addition of the fibers and at an $L_B/D$ ratio of from about 5 to about 25, or from about 8 to about 20.

Following addition of the aromatic amide oligomer, the filled composition can be mixed to distribute the aromatic amide oligomer throughout the composition. The composition may then be passed under a vacuum, for instance at an $L_B/D$ ratio of between about 30 and about 40, the application of which facilitates the removal of volatiles formed during the final stages of polycondensation and/or during blending of the composition. The vacuum may be created by the application of a suctional pressure, such as within the range of from about 5 to about 30 pounds per square inch ("psi"), and in some embodiments, from about 10 to about 20 psi.

Mineral fillers may be employed as a filler material to improve mechanical properties. Mineral fillers may, for instance, be employed in the filled polymer composition to help achieve the desired mechanical properties and/or appearance. Such fillers are particularly desirable when forming thermoformed articles. When employed, mineral fillers typically constitute from about 5 wt. % to about 60 wt. %, in some embodiments from about 10 wt. % to about 55 wt. %, and in some embodiments, from about 20 wt. % to about 50 wt. % of the polymer composition. Clay minerals may be particularly suitable for use in the present invention. Examples of such clay minerals include, for instance, talc ($Mg_3Si_4O_{10}(OH)_2$), halloysite ($Al_2Si_2O_5(OH)_4$), kaolinite ($Al_2Si_2O_5(OH)_4$), illite (($K,H_3O)(Al,Mg,Fe)_2(Si,Al)_4O_{10}[(OH)_2,(H_2O)]$), montmorillonite ($(Na,Ca)_{0.33}(Al,Mg)_2Si_4O_{10}(OH)_2 \cdot nH_2O$), vermiculite (($MgFe,Al)_3(Al,Si)_4O_{10}(OH)_2 \cdot 4H_2O$), palygorskite (($Mg,Al)_2Si_4O_{10}(OH) \cdot 4(H_2O)$), pyrophyllite ($Al_2Si_4O_{10}(OH)_2$), etc., as well as combinations thereof. In lieu of, or in addition to, clay minerals, still other mineral fillers may also be employed. For example, other suitable silicate fillers may also be employed, such as calcium silicate, aluminum silicate, mica, diatomaceous earth, wollastonite, and so forth. Mica, for instance, may be particularly suitable. There are several chemically distinct mica species with considerable variance in geologic occurrence, but all have essentially the same crystal structure. As used herein, the term "mica" is meant to generically include any of these species, such as muscovite ($KAl_2(AlSi_3)O_{10}(OH)_2$), biotite ($K(Mg,Fe)_3(AlSi_3)O_{10}(OH)_2$), phlogopite ($KMg_3(AlSi_3)O_{10}(OH)_2$), lepidolite ($K(Li,Al)_{2-3}(AlSi_3)O_{10}(OH)_2$), glauconite ($(K,Na)(Al,Mg,Fe)_2(Si,Al)_4O_{10}(OH)_2$), etc., as well as combinations thereof.

Still other additives that can be included in the filled polymer composition may include, for instance, antimicrobials, pigments (e.g., carbon black), antioxidants, stabilizers, surfactants, waxes, solid solvents, and other materials added to enhance properties and processability. Lubricants, for instance, may be employed in the polymer composition. Examples of such lubricants include fatty acids esters, the salts thereof, esters, fatty acid amides, organic phosphate esters, and hydrocarbon waxes of the type commonly used as lubricants in the processing of engineering plastic materials, including mixtures thereof. Suitable fatty acids typically have a backbone carbon chain of from about 12 to about 60 carbon atoms, such as myristic acid, palmitic acid, stearic acid, arachic acid, montanic acid, octadecinic acid, parinric acid, and so forth. Suitable esters include fatty acid esters, fatty alcohol esters, wax esters, glycerol esters, glycol esters and complex esters. Fatty acid amides include fatty primary amides, fatty secondary amides, methylene and ethylene bisamides and alkanolamides such as, for example, palmitic acid amide, stearic acid amide, oleic acid amide, N,N'-ethylenebisstearamide and so forth. Also suitable are the metal salts of fatty acids such as calcium stearate, zinc stearate, magnesium stearate, and so forth; hydrocarbon waxes, including paraffin waxes, polyolefin and oxidized polyolefin waxes, and microcrystalline waxes. Particularly suitable lubricants are acids, salts, or amides of stearic acid, such as pentaerythritol tetrastearate, calcium stearate, or N,N'-ethylenebisstearamide. When employed, the lubricant(s) typically constitute from about 0.05 wt. % to about 1.5 wt. %, and in some embodiments, from about 0.1 wt. % to about 0.5 wt. % (by weight) of the polymer composition.

The filled polymer composition can exhibit low melt viscosity, which can enhance processing characteristics and lead to improved product characteristics, and can also exhibit excellent mechanical characteristics due to the presence and high distribution of the filler material throughout the composition. For example, a filled composition may have a melt viscosity of from about 0.5 to about 25 Pa-s, in some embodiments from about 2 to about 20 Pa-s, as determined at a shear rate of 1000 seconds$^{-1}$ and may also exhibit excellent strength characteristics. By way of example, a filled composition can have a tensile strength of greater than about 150 MPa, or greater than about 160 MPa; a tensile elongation of greater than about 1.75%, greater than about 1.80%, or greater than about 2.00%; and/or a tensile modulus of greater than about 15,000 MPa, or greater than about 16,000. Tensile properties can be determined according to ISO Test No. 527 (technically equivalent to ASTM D638) at a temperature of 23° C. and at a test speed of 5 mm/min. The filled composition can have flexural strength of greater than about 225 MPa, or greater than about 230 MPa, and/or flexural modulus of greater than about 16,000 MPa, or greater than about 16,500 MPa as determined according to ISO Test No. 178 (technically equivalent to ASTM D790) at a temperature of 23° C. The filled composition can have a notched Charpy impact strength of greater than about 30 kJ/m$^2$, or greater than about 35 kJ/m$^2$ as determined according to ASTM D256, Method B (technically equivalent to ISO 179-1) at 23° C. The filled composition can have a deflection temperature under load (DTUL) of greater than about 260° C., or greater than about 265° C. as measured according to ASTM D648-07 (technically equivalent to ISO Test No. 75-2) at a specified load of 1.8 MPa.

The present invention may be better understood with reference to the following examples.

Test Methods

Melt Viscosity:

The melt viscosity (Pa-s) was determined in accordance with ISO Test No. 11443 at 350° C. and at a shear rate of 400 s$^{-1}$ and 1000 s$^{-1}$ using a Dynisco 7001 capillary rheometer. The rheometer orifice (die) had a diameter of 1 mm, length of 20 mm, L/D ratio of 20.1, and an entrance angle of 180°. The diameter of the barrel was 9.55 mm±0.005 mm and the length of the rod was 233.4 mm.

Intrinsic Viscosity:

The intrinsic viscosity ("IV") may be measured in accordance with ISO-1628-5 using a 50/50 (v/v) mixture of pentafluorophenol and hexafluoroisopropanol. Each sample was prepared in duplicate by weighing about 0.02 grams into a 22 mL vial. 10 mL of pentafluorophenol ("PFP") was added to each vial and the solvent. The vials were placed in a heating block set to 80° C. overnight. The following day 10 mL of hexafluoroisopropanol ("HFIP") was added to each vial. The final polymer concentration of each sample was about 0.1%. The samples were allowed to cool to room temperature and analyzed using a PolyVisc automatic viscometer.

Melting and Crystallization Temperatures:

The melting temperature ("Tm") and crystallization temperature ("Tc") were determined by differential scanning calorimetry ("DSC") as is known in the art. The melting temperature is the differential scanning calorimetry (DSC) peak melt temperature as determined by ISO Test No. 11357. The crystallization temperature is determined from the cooling exotherm in the cooling cycle. Under the DSC procedure, samples were heated and cooled at 20° C. per minute as stated in ISO Standard 10350 using DSC measurements conducted on a TA Q2000 Instrument.

Deflection Under Load Temperature ("DTUL"):

The deflection under load temperature was determined in accordance with ISO Test No. 75-2 (technically equivalent to ASTM D648-07). More particularly, a test strip sample having a length of 80 mm, thickness of 10 mm, and width of 4 mm was subjected to an edgewise three-point bending test in which the specified load (maximum outer fibers stress) was 1.8 Megapascals. The specimen was lowered into a silicone oil bath where the temperature is raised at 2° C. per minute until it deflects 0.25 mm (0.32 mm for ISO Test No. 75-2).

Tensile Properties:

Tensile properties are tested according to ISO Test No. 527 (technically equivalent to ASTM D638). Modulus and strength measurements are made on the same test strip sample having a length of 80 mm, thickness of 10 mm, and width of 4 mm. The testing temperature is 23° C., and the testing speeds are 1 or 5 mm/min.

Flexural Properties:

Flexural properties are tested according to ISO Test No. 178 (technically equivalent to ASTM D790). This test is performed on a 64 mm support span. Tests are run on the center portions of uncut ISO 3167 multi-purpose bars. The testing temperature is 23° C. and the testing speed is 2 mm/min.

Notched Charpy Impact Strength:

Notched Charpy properties are tested according to ISO Test No. ISO 179-1) (technically equivalent to ASTM D256, Method B). This test is run using a Type A notch (0.25 mm base radius) and Type 1 specimen size (length of 80 mm, width of 10 mm, and thickness of 4 mm). Specimens are cut from the center of a multi-purpose bar using a single tooth milling machine. The testing temperature is 23° C.

Density:

Density was determined according to ISO Test No. 1183 (technically equivalent to ASTM D792). The specimen was weighed in air then weighed when immersed in distilled water at 23° C. using a sinker and wire to hold the specimen completely submerged as required.

Weldline Strength—LGA:

The weldline strength is determined by first forming an injection molded line grid array ("LGA") connector (size of 49 mm×39 mm×1 mm) from a thermoplastic composition sample as is well known in the art. Once formed, the LGA connector is placed on a sample holder. The center of the connector is then subjected to a tensile force by a rod moving at a speed of 5.08 millimeters per minute. The peak stress is recorded as an estimate of the weldline strength.

Warpage—LGA:

The warpage is determined by first forming an injection molded line grid array ("LGA") connector (size of 49 mm×39 mm×1 mm) from a thermoplastic composition sample as is well known in the art. A Cores coplanarity measuring module, model core9037a, is used to measure the degree of warpage of the molded part. The test is performed; connector as molded (unaged), and conditioned in 20 minute temperature cycle that ramps from ambient temperature to 270° C., is maintained for 3 minutes and ramped back to room temperature (aged).

Blister Free Temperature:

To test blister resistance, a 127×12.7×0.8 mm test bar is molded at 5° C. to 10° C. higher than the melting temperature of the polymer resin, as determined by DSC. Ten (10) bars are immersed in a silicone oil at a given temperature for 3 minutes, subsequently removed, cooled to ambient conditions, and then inspected for blisters (i.e., surface deformations) that may have formed. The test temperature of the silicone oil begins at 250° C. and is increased at 10° C. increments until a blister is observed on one or more of the test bars. The "blister free temperature" for a tested material is defined as the highest temperature at which all ten (10) bars tested exhibit no blisters. A higher blister free temperature suggests a higher degree of heat resistance.

Synthesis of N1,N4-diphenylterephthalamide

Compound A

The synthesis of Compound A from terephthaloyl chloride and aniline may be performed according to the following scheme:

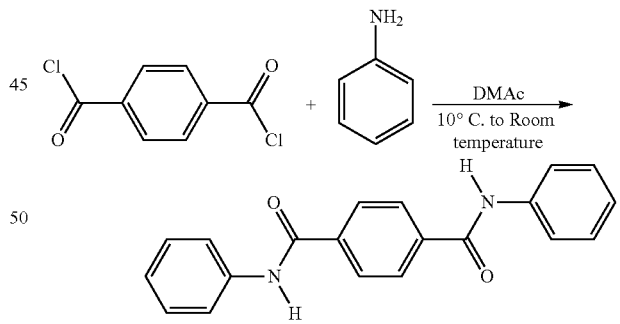

The experimental set up consisted of a 2 L glass beaker equipped with a glass rod stirrer coupled with an overhead mechanical stirrer. Dimethyl acetamide ("DMAc") (3 L) was added to the beaker and the beaker was immersed in an ice bath to cool the system to 10-15° C. Then aniline (481.6 g) was added to the solvent with constant stirring, the resultant mixture was cooled to 10-15° C. Terephthaloyl chloride (300 g) was added gradually to the cooled stirred mixture such that the temperature of the reaction was maintained below 30° C. The acid chloride was added over a period of one-two hours, after which the mixture was stirred for another three hours at 10-15° C. and then at room temperature overnight. The reaction mixture was milky white (a fine suspension of the product in the solvent) and was vacuum filtered using a filter paper and a Buchner funnel. The crude product was washed with acetone (2 L) and then washed with hot water (2 L). The product was then air dried over night at room temperature and then was dried in a vacuum oven 150° C. for 4-6 hours. The product (464.2 g) was a highly crystalline white solid. The melting point was 346-348° C., as determined by differential scanning calorimetry ("DSC"). The Proton NMR characterization for the compound is also shown in FIG. 1.

Synthesis of N1,N4-diphenylisoterephthanalide

Compound B

The synthesis of Compound B from isophthaloyl chloride and aniline may be performed according to the following scheme:

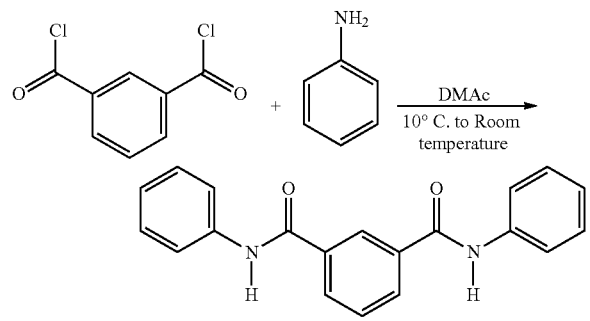

Figure 2:
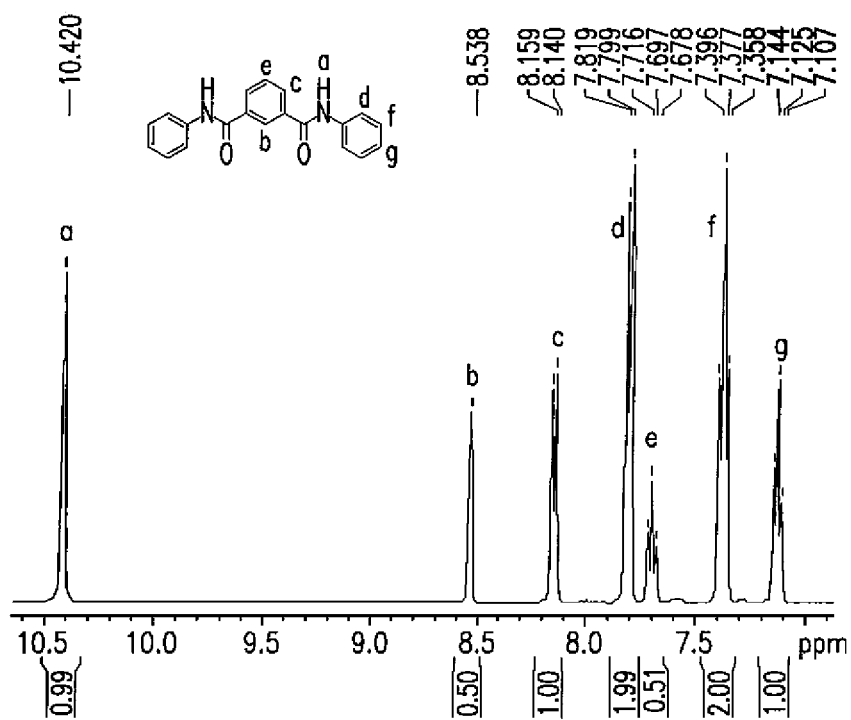
FIG. 2 is the Proton NMR characterization for N1,N4-diphenylisoterephthalamide (Compound B)

The experimental set up consisted of a 2 L glass beaker equipped with a glass rod stirrer coupled with an overhead mechanical stirrer. DMAc (1.5 L) was added to the beaker and the beaker was immersed in an ice bath to cool the solvent to 10-15° C. Then aniline (561.9 g) was added to the solvent with constant stirring, the resultant mixture was cooled to 10-15° C. Isophthaloyl chloride (350 g dissolved in 200 g of DMAc) was added gradually to the cooled stirred mixture such that the temperature of the reaction was maintained below 30° C. The acid chloride was added over a period of one hour, after which the mixture was stirred for another three hours at 10-15° C. and then at room temperature overnight. The reaction mixture was milky white in appearance. The product was recovered by precipitation by addition of 1.5 L of distilled water and followed by was vacuum filtration using a filter paper and a Buchner funnel. The crude product was then washed with acetone (2 L) and then washed again with hot water (2 L). The product was then air dried over night at room temperature and then was dried in a vacuum oven 150° C. for 4-6 hours. The product (522 g) was a white solid. The melting point was 290° C. as determined by DSC. The Proton NMR characterization for the compound is also shown in FIG. 2.

Synthesis of N1,N4-bis(2,3,4,5,6-pentafluorophenyl) terephthalamide

Compound C

The synthesis of Compound C from pentafluorophenol and terephthaloyl chloride may be performed according to the following scheme:

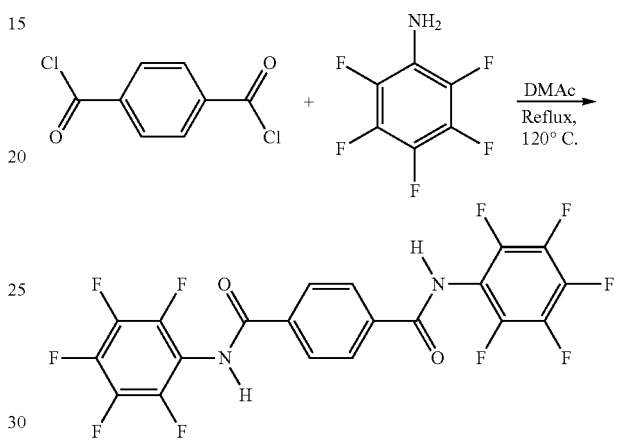

Figure 3:
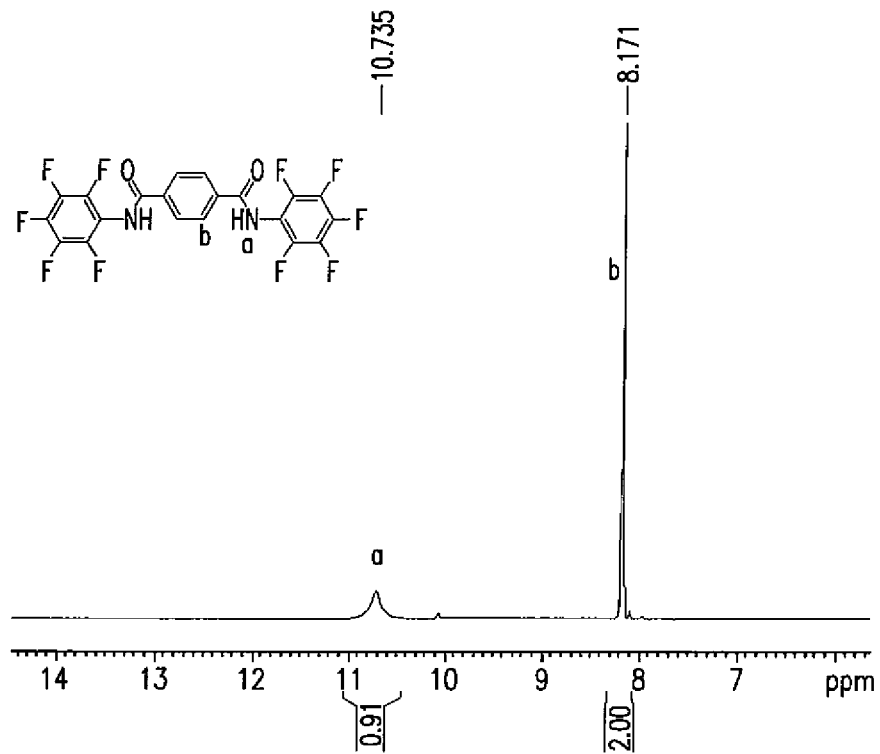
FIG. 3 is the Proton NMR characterization for N1,N4-bis(2,3,4,5,6-pentafluorophenyl)terephthalamide (Compound C)

Pentafluoroaniline (10 g) was dissolved in dimethyl acetamide (DMAc) (50 mL) and terephthaloyl chloride (3.7 g) was added in one portion. The reaction mixture was stirred and then refluxed for six (6) hours at 120° C. The reaction mixture was then cooled and 200 mL water was added to the mixture to precipitate the crude product. The product was then filtered and dried. The crude product was then washed with acetone (100 mL) and dried to give a white powder as the final product (6.8 g). The melting point by DSC was 331.6° C. The Proton NMR characterization for the compound is shown in FIG. 3.

Synthesis of N4-phenyl-N1-[4-[[4-(phenylcarbamoyl)benzoyl]amino]phenyl] terephthalamide Compound E The synthesis of Compound E from 4-amino benzanilide and terephthaloyl chloride can be performed according to the following scheme:

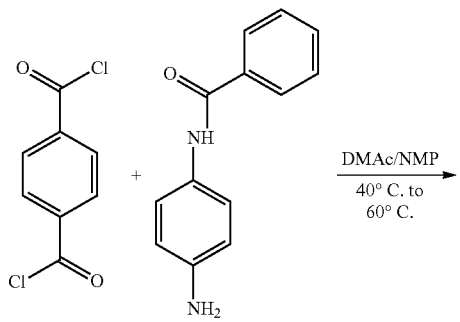

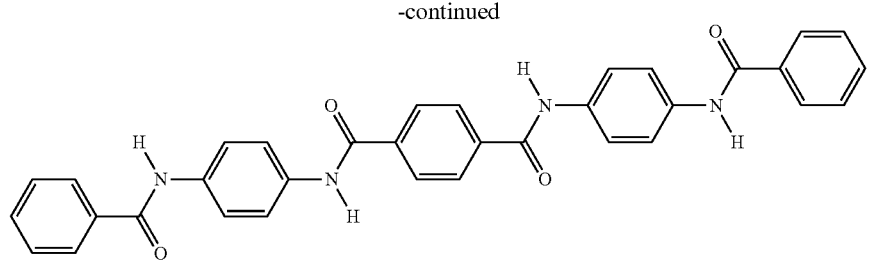

The experimental setup consisted of a 1 L glass beaker equipped with a glass rod stirrer coupled with an overhead mechanical stirrer. 4-aminobenzanilide (20.9 g) was dissolved in warm DMAc (250 mL) (alternatively N-methylpyrrolidone can also be used). Terephthaloyl chloride (10 g) was added to the stirred solution of the diamine maintained at 40-50° C., upon the addition of the acid chloride the reaction temperature increased from 50° C. to 80° C. After the addition of the acid chloride was completed, the reaction mixture was warmed to 70-80° C. and maintained at that temperature for about three hours and allowed to rest overnight at room temperature. The product was then isolated by the addition of water (500 mL) followed by vacuum filtration followed by washing with hot water (1 L). The product was then dried in a vacuum oven at 150° C. for about 6-8 hours, to give a pale yellow colored solid (yield ca. 90%). The melting point by DSC was 462° C.

Synthesis of N1,N3-bis(4-benzamidophenyl)benzene-1,3-dicarboxamide

Compound F2

The synthesis of Compound F2 from 1,4-phenylene diamine, terephthaloyl chloride, and benzoyl chloride may be performed according to the following scheme:

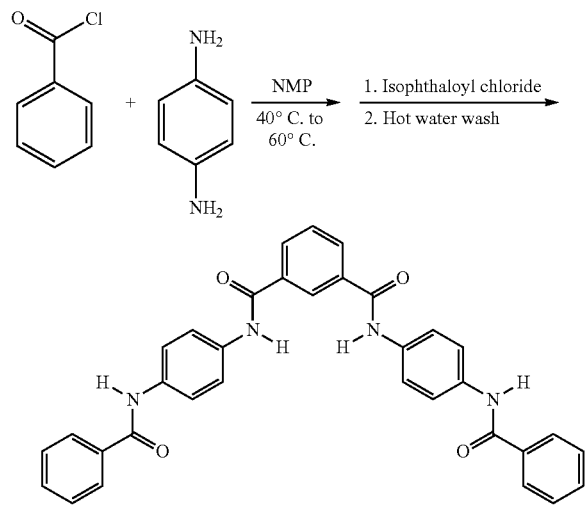

Figure 4:
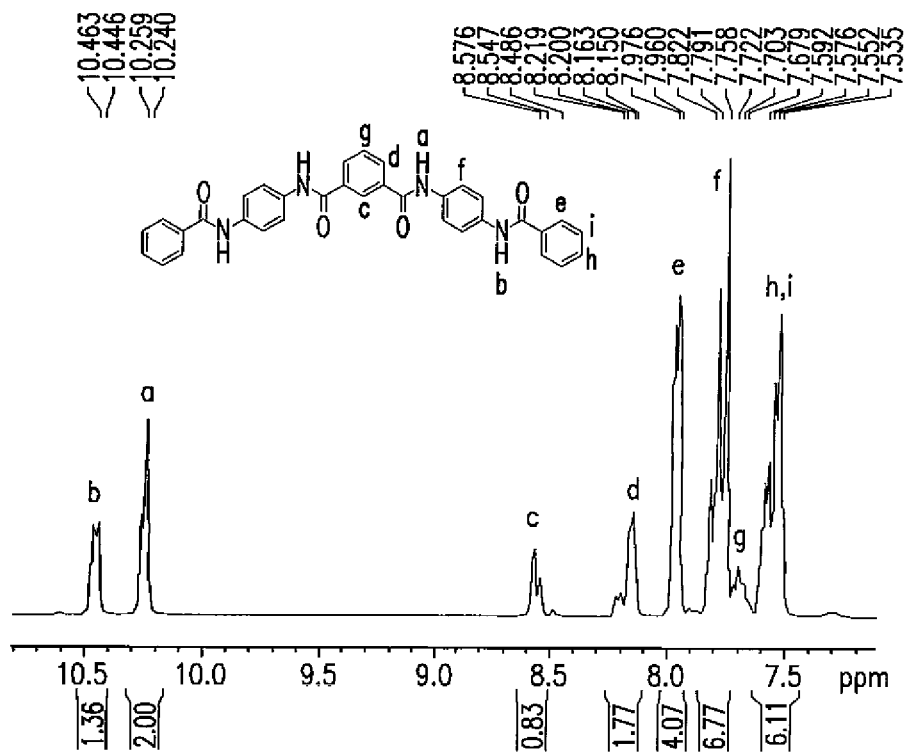
FIG. 4 is the Proton NMR characterization for N1,N3-bis(4-benzamidophenyl)benzene-1,3-dicarboxamide (Compound F2)

The experimental setup consisted of a 500 mL glass beaker equipped with a magnetic stirrer. 1,4 phenylene diamine (20 g) was dissolved in warm NMP (200 mL) at 40° C. Benzoyl chloride (26.51 g) was added drop wise to a stirred solution of the diamine over a period of 30 minutes. After the addition of the benzoyl chloride was completed, the reaction mixture was warmed to 70-80° C. and then allowed to cool to 50° C. After cooling to the desired temperature, isophthaloyl chloride (18.39 g) was added in small portions such that the temperature of the reaction mixture did not increase above 70° C. The mixture was then stirred for additional one (1) hour at 70° C., and was allowed to rest overnight at room temperature. The product was recovered by addition of water (200 mL) to the reaction mixture, followed by filtration and washing with hot water (500 mL). The product was then dried in a vacuum oven at 150° C. for about 6-8 hours to give a pale yellow colored solid (51 g). The melting point by DSC was 329° C. The Proton NMR characterization for the compound is also shown in FIG. 4.

Synthesis of N1,N3-bis(3-benzamidophenyl)benzene-1,3-dicarboxamide

Compound G2

The synthesis of Compound G2 from 1,3-phenylene diamine, isophthaloyl chloride, and benzoyl chloride may be performed according to the following scheme:

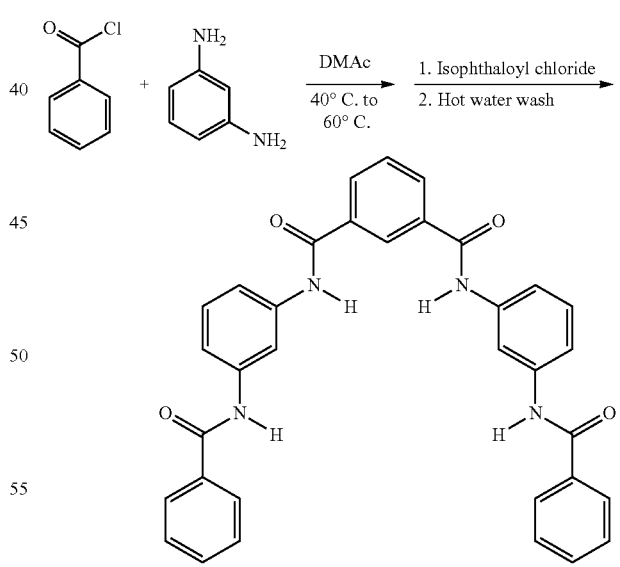

Figure 5:
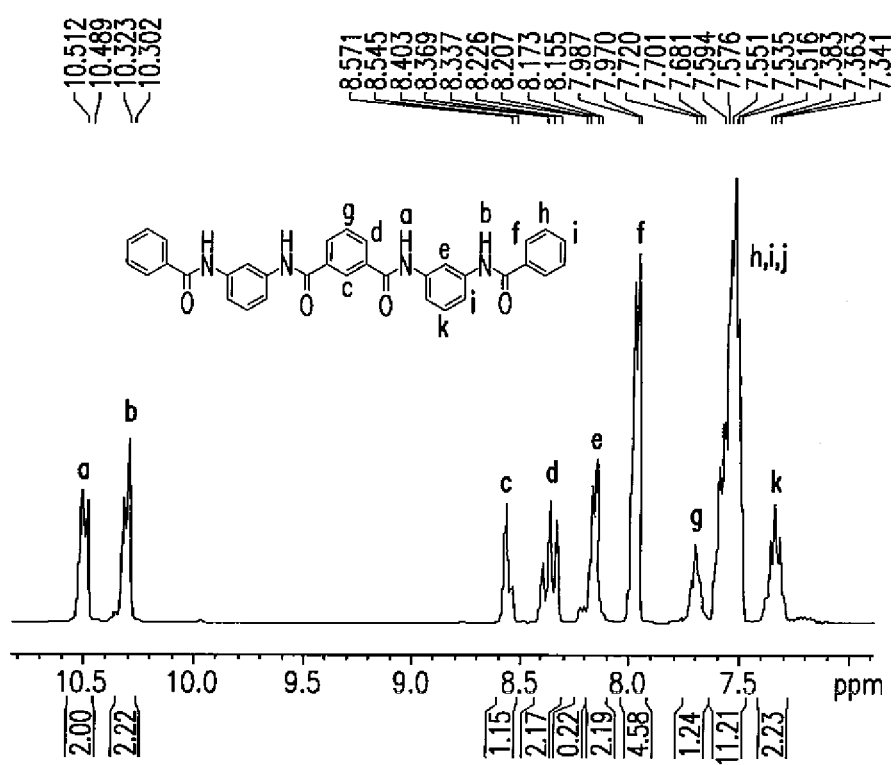
FIG. 5 is the Proton NMR characterization for N3-phenyl-N1-[3-[[3-(phenylcarbamoyl)benzoyl]amino]phenyl]benzene-1,3-dicarboxamide (Compound G2).

The experimental setup consisted of a 500 mL glass beaker equipped with a magnetic stirrer. 1,3 phenylene diamine (20 g) was dissolved in warm DMAc (200 mL) at 40° C. Benzoyl chloride (26.51 g) was added drop wise to a stirred solution of the diamine over a period of 30 minutes. After the addition of the benzoyl chloride was completed, the reaction mixture was warmed to 70-80° C. and allowed to cool to 50° C. After cooling to the desired temperature, isophthaloyl chloride (18.39 g) was added in small portions such that the temperature of the reaction mixture did not increase above 70° C. The mixture was then stirred for additional one hour at 70° C., and was allowed to rest overnight at room temperature. The product was recovered by addition of water (200 mL) to the reaction mixture, followed by filtration and washing with hot water (500 mL). The product was then dried in a vacuum oven at 150° C. for about 6-8 hours to give a pale yellow colored solid (45 g). The Proton NMR characterization for the compound is also shown in FIG. 5.

Synthesis of 1,3-Benzenedicarboxamide, N1,N3-dicyclohexyl

Compound K1

The synthesis of Compound K1 from isophthaloyl chloride and cyclohexyl amine can be performed according to the following scheme:

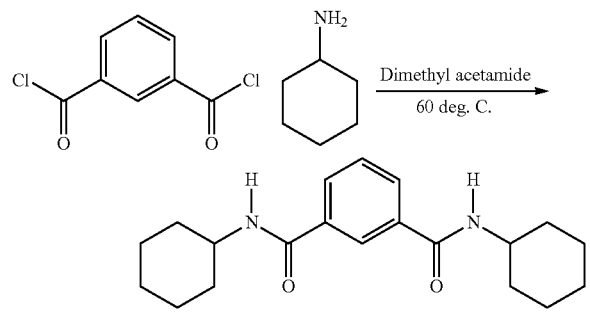

The experimental set up consisted of a 1 L glass beaker equipped with a glass rod stirrer coupled with an overhead mechanical stirrer. Cyclohexyl amine (306 g) was mixed in dimethyl acetamide (1 L) (alternatively N-methylpyrrolidone can also be used) and triethyl amine (250 g) at room temperature. Next isopthaloyl chloride (250 g) was slowly added over a period of 1.5 to 2 hours, to the amine solution with constant stirring. The rate of addition of the acid chloride was maintained such that the reaction temperature was maintained less than 60° C. After complete addition of the benzoyl chloride, the reaction mixture was gradually warmed to 85-90° C. and then allowed to cool to around 45-50° C. The mixture was allowed to rest overnight (for at least 3 hours) at room temperature. The product was recovered by precipitation through the addition of 1.5 L of distilled water, which was followed by was vacuum filtration using a filter paper and a Buchner funnel. The crude product was then washed with acetone (250 mL) and washed again with hot water (500 mL). The product (yield: ca. 90%) was then air dried over night at room temperature and then was dried in a vacuum oven 150° C. for 4 to 6 hours. The product was a white solid. The Proton NMR characterization was as follows: $^1$H NMR (400 MHz d$_6$-DMSO): 8.3 (s, 2H, CONH), 8.22 (s, 1H, Ar), 7.9 (d, 2H, Ar), 7.5 (s, 1H, Ar), 3.7 (broad s, 2H, cyclohexyl), 1.95-1.74 broad s, 4H, cyclohexyl) and 1.34-1.14 (m, 6H, cyclohexyl).

EXAMPLE 1

Compound A was synthesized as described above and tested for its influence on the melt viscosity of a polymer that is commercially available from Ticona, LLC and has the following monomer content: 63% 4-hydroxybenzoic acid ("HBA"), 5% 2,6-hydroxynaphthoic acid ("HNA"), 16% terephthalic acid ("TA"), 11% 4,4'-biphenol ("BP"), and 5% acetaminophen ("APAP"). More particularly, the polymer was heated at 120° C. and powder coated with a pentaerythritol tetrastearate (PETS, commercial grade Lanza Glycolube P) at a 0.3 wt. % loading based on the weight of the polymer. Various concentrations of Compound A were tested. The results are set forth below.

| Resin Base | Compound A (wt. %) | Melt Viscosity (1000 s$^{-1}$), Pa-s | Ratio of Viscosity of Initial Polymer to Blended Composition |
|---|---|---|---|
| Low Viscosity | 0.0 | 18.6 | — |
| | 0.3 | 16.0 | 1.16 |
| | 0.6 | 14.4 | 1.29 |
| | 1.0 | 12.4 | 1.50 |
| High Viscosity | 0.0 | 26.1 | — |
| | 0.3 | 25.2 | 1.04 |
| | 0.6 | 23.4 | 1.12 |

As indicated, even small amounts of Compound A resulted in a significant decrease in melt viscosity.

EXAMPLE 2

Compound A was synthesized as described above and tested for its influence on the melt viscosity of the commercial grade polymer used in Example 1 and a filler material. More particularly, a control sample was formed by heating the polymer at 120° C. and powder coating it with a pentaerythritol tetrastearate (PETS, commercial grade Lonza Glycolube P) at a 0.3 weight % loading based on the polymer. The coated polymer was then compounded with glass and talc fillers within a 25-mm extruder. Another sample was made in a similar manner, except that it contained 1 wt. % of Compound A. The compositions and their respective properties are set forth below.

| Composition | Control | Sample |
|---|---|---|
| Commercial Polymer (wt. %) | 59.7 | 58.7 |
| Glycolube P (wt. %) | 0.3 | 0.3 |
| Milled glass (wt. %) | 10 | 10 |
| Talc (wt. %) | 30 | 30 |
| Melt Viscosity (350° C., 1000 s$^{-1}$), Pa-s | 37.6 | 28.8 |
| Intrinsic Viscosity | 4.13 | 4.40 |
| Tensile Modulus (MPa) | 9.76 | 10.01 |
| Break Stress (MPa) | 108.2 | 110.2 |
| Break Strain (%) | 3.00 | 3.02 |

As indicated, Compound A was able to reduce viscosity even in the presence of filler materials.

EXAMPLE 3

Compounds A, B, C, E, F2, and G2 were synthesized as described above and tested for their influence on the melt viscosity of the commercial grade polymer used in Example 1. More particularly, the polymer was heated at 120° C. and powder coated with a pentaerythritol tetrastearate (PETS, commercial grade Lonza Glycolube P) at a 0.3 wt. % loading based on the weight of the polymer. The hot pellets were then coated with 2 wt. % (based on polymer weight) of one of Compounds A, B, C, E, F2, and G2. A control sample was also formed that employed 4,4'-biphenol as a flow additive in an amount of 2 wt. %. The mixtures were then melt mixed using a Leistritz 18 mm co-rotating fully intermeshing twin screw extruder having 6 temperature control zones (including at the extrusion die) and an overall L/D of 30. A general purpose screw design was used to compound the oligomers into a resin matrix. All materials were fed to the feed throat in the first barrel by means of a volumetric feeder. Materials were melted and mixed then extruded through a single hole strand die. Material was then quenched in a water bath to solidify and granulated in a pelletizer. The resultant pellets were then dried for 3 hours at 120° C. and scanning shear capillary melt viscosity measurements were carried out at 350° C. The results are set forth below.

that a significant reduction in mechanical properties did not occur because the oligomers did not react directly with the polymer backbone to reduce its molecular weight.

EXAMPLE 4

Pellet samples were formed of a solid-state polymerized liquid crystalline polymer that is commercially available from Ticona LLC and has the following monomer content: 61% HBA, 3% HNA, 18% TA, 13% BP, and 5% APAP. The

| Comp. | Polymer | Polymer + Compound A | Polymer + Compound B | Polymer + Compound C | Polymer + Compound E | Polymer + Compound F2 | Polymer + Compound G2 | Polymer + Biphenol |
|---|---|---|---|---|---|---|---|---|
| Melt Viscosity ($1000\ s^{-1}$) (Pa-s) | 25.3 | 14.9 | 3.7 | 10.7 | 17.4 | 8.8 | 5.7 | 6.4 |
| Ratio of Initial MV to Blend MV ($1000^{-1}$) | — | 1.7 | 6.8 | 2.4 | 1.5 | 2.9 | 4.4 | 4.0 |
| Melt Viscosity ($400\ s^{-1}$) (Pa-s) | 33.3 | 20.6 | 5.4 | 13.2 | 23.1 | 10.9 | 8.8 | 7.6 |
| Ratio of Initial MV to Blend MV ($400^{-1}$) | — | 1.6 | 6.2 | 2.5 | 1.4 | 3.1 | 3.8 | 4.4 |
| Intrinsic Visc. (dL/g) | 6.96 | 6.47 | 7.08 | 5.41 | 5.09 | 6.40 | 5.50 | 4.39 |
| Tm (° C.) | 336.4 | 329.5 | 319.8 | 327.36 | 335.4 | 329.2 | 322.5 | 329.9 |
| Tc (° C.) | 289.3 | 283.9 | 284.3 | 288.82 | 309.2 | 288 | 283.72 | 310.1 |

As indicated, a melt viscosity reduction (increase in the flow) of almost 85% (ratio of 6.8) was achieved through the oligomers of the present invention. To determine if this resulted in a change in the mechanical properties, the pellets were also injection molded to obtain specimen samples for tensile, impact, flexural and heat distortion temperature measurements. The results are set forth below.

pellets were heated at 120° C. and powder coated with a pentaerythritol tetrastearate (PETS, commercial grade Lonza Glycolube P) at a 0.3 wt. % loading based on the polymer. The hot pellets were then coated with fine powders of Compounds A and E at a 2 wt. % loading based on the weight of the polymer. A sample with only PETS was also prepared similarly for baseline purposes. The samples were thoroughly

| Comp. | Polymer | Polymer + Compound A | Polymer + Compound B | Polymer + Compound C | Polymer + Compound E | Polymer + Compound F2 | Polymer + Compound G2 | Polymer + Biphenol |
|---|---|---|---|---|---|---|---|---|
| Flexural Modulus (MPa) | 12,500 | 12,300 | 11,850 | 11,750 | 11,100 | 11,000 | 11,300 | 10,950 |
| Flexural Break Stress (MPa) | 167 | 156 | 152 | 150 | 155 | 151 | 143 | 141 |
| Flexural Break Strain (%) | 3.4 | 2.9 | 2.9 | 3.0 | 3.5 | 3.3 | 2.7 | 2.6 |
| Tensile Modulus (MPa) | 13,150 | 13,350 | 13,100 | 12,650 | 11,100 | 10,550 | 11,800 | 11,750 |
| Tensile Break Stress (MPa) | 152 | 160 | 162 | 147 | 153 | 146 | 147 | 129 |
| Tensile Break Strain (%) | 1.74 | 1.90 | 1.92 | 1.77 | 2.28 | 2.18 | 1.86 | 2.15 |
| Charpy Notched (kJ/m) | 90.9 | 72.6 | 76.5 | 63.8 | 71.3 | 75.7 | 65.3 | 49.2 |

As indicated, only a small change in the mechanical properties was observed for the compositions of the present invention. Without intending to be limited by theory, it is believed mixed to evenly coat the pellets with the powder compounds. The mixtures were then melt mixed using a Leistritz 18 mm co-rotating, fully-intermeshing, twin-screw extruder with an overall L/D of 30 and six temperature control zones including one at the die. A general purpose screw design was used to compound the oligomers into a resin matrix. All materials were fed to the feed throat in the first barrel by means of a volumetric feeder. Materials were melted and mixed then extruded through a single hole strand die. The strands were water-quenched in a bath to solidify and granulated in a pelletizer. All compositions were compounded at a rate of 11 pounds per hour, a barrel temperature of 360-370° C., and a screw speed around 300 rpm. Melt mixing parameters and the resultant screw torque are provided in the table below.

| Sample | Control | Control + Compound A (2 wt. %) | Control + Compound E (2 wt. %) |
|---|---|---|---|
| Screw speed (rpm) | 300 | 301 | 305 |
| Throughput rate (lb/hr) | 10 | 11 | 11 |
| Torque (amp) | 5-12 | 8-10 | 9-11 |
| Barrel Temp Zone 1 (° C.) | 177 | 175 | 270 |
| Barrel Temp Zone 2 (° C.) | 308 | 305 | 367 |
| Barrel Temp Zone 3 (° C.) | 370 | 367 | 371 |
| Barrel Temp Zone 4 (° C.) | 370 | 370 | 371 |
| Barrel Temp Zone 5 (° C.) | 370 | 370 | 371 |
| Die Head Temp (° C.) | 380 | 380 | 371 |

All compositions resulted in a decrease in extruder torque as compared to the control, suggesting that these compositions displayed lower viscosities at high shear rates. The resultant pellets were then dried for three hours at 120° C. and melt viscosity measurements were carried out at 370° C. The thermal properties were then tested as described above. The results are set forth below.

| Comp. | Control | Control + Compound A | Control + Compound E |
|---|---|---|---|
| Melt Viscosity (1000 s$^{-1}$) (Pa-s) | 130.8 | 60.2 | 66.1 |
| Ratio of Initial MV to Blend MV (1000$^{-1}$) | — | 2.2 | 2.0 |
| Melt Viscosity (400 s$^{-1}$) (Pa-s) | 223.9 | 101 | 103.8 |
| Ratio of Initial MV to Blend MV (400$^{-1}$) | — | 2.2 | 2.2 |
| Intrinsic Visc. (dL/g) | 10.4 | 10 | 8.6 |
| Tm (° C.) | 362.7 | 354.4 | 358.8 |
| Tc (° C.) | 301.7 | 297.5 | 321.9 |

As indicated, Compounds A and E resulted in a decrease in melt viscosity. The pellets were then injection molded to obtain specimen samples for tensile, impact, flexural and deflection temperature under load (DTUL) measurements. All compositions were injection molded at ISO 294 conditions. The pellets were dried for 3 hours at 120° C. The properties are set forth below.

| Comp. | Control | Control + Compound A | Control + Compound E |
|---|---|---|---|
| DTUL (° C.) | 248.4 | 260.5 | 263.3 |
| Flexural Modulus (MPa) | 12,500 | 15,700 | 15,150 |
| Flexural Break Stress (MPa) | 161.9 | 180.8 | 180.6 |
| Flexural Break Strain (%) | 3.19 | 3.29 | 3.07 |
| Tensile Modulus (MPa) | 10,700 | 15,540 | 15,050 |
| Tensile Break Stress (MPa) | 117.71 | 171.52 | 182.78 |
| Tensile Break Strain (%) | 1.62 | 1.69 | 1.75 |
| Charpy Notched (kJ/m) | 74.2 | 64.6 | 87.0 |

As shown in the tables above, remarkable drops of 50-80% were seen in the melt viscosity (MV) of TLCPs prepared with relatively low levels of Compounds A and E. Notably, these viscosity reductions did not result in a substantial change in mechanical properties.

EXAMPLE 5

A two-liter, three-neck flask was charged with 4-hydroxybenzoic acid (562.0 g), 2,6-hydroxynaphthoic acid (61.2 g), terephthalic acid (174.9), 4,4'-biphenol (135.6 g), acetaminophen (49.1 g), potassium acetate (43 mg), and Compound A (17 g). The flask next was equipped with C-shaped stirrer, a thermal couple, a gas inlet, and distillation head. The flask was placed under a low nitrogen purge and acetic anhydride (99.7% assay, 651.9 g) was added. The milky-white slurry was agitated at 75 rpm and heated to 140° C. over the course of 95 minutes using a fluidized sand bath. After this time, the mixture was then gradually heated to 350° C. steadily over 290 minutes. Reflux was seen once the reaction exceeded 140° C. and the overhead temperature increased to approximately 115° C. as acetic acid byproduct (760 g) was removed from the system. During the heating, the mixture became yellow and slightly more viscous and the vapor temperature gradually dropped to 90° C. Once the mixture had reached 350° C., the nitrogen flow was stopped. The flask was evacuated below 20 psi and the agitation slowed to 30 rpm over the course of 45 minutes. After 102 minutes, the reaction was then stopped by releasing the vacuum and stopping the heat flow to the reactor—no torque reading was recorded. The reaction mixture had a very low viscosity as compared to a control without Compound A. The flask was cooled and then polymer was recovered as a solid, dense yellow-brown plug. Sample for analytical testing was obtained by mechanical size reduction. Yield=821.39 g. The thermal properties are set forth below.

Thermal Behavior (DSC second cycle): Tm=326.26° C., Tc=281.97° C.

Melt Viscosity (Scanning Shear, 350° C.): MV (1000 s$^{-1}$)= 6.2 Pa-s, MV (400 s$^{-1}$)=8.2 Pa-s Intrinsic Viscosity=4.0

To evaluate the effect of Compound A on the mechanical properties of parts, polymers were synthesized as described above and then injection molded to yield test specimens for mechanical testing. The results are set forth below.

| Sample | Tm (° C.) | Tc (° C.) | MV at 1000 s$^{-1}$ (Pa * s) at 350° C. | Flexural Strength (MPa) | Tensile Strength (MPa) | DTUL (° C.) |
|---|---|---|---|---|---|---|
| Control | 345.40 | 290.21 | 69 | 162.59 | 152.62 | 235 |
| Control + Compound A | 327.43 | 281.97 | 8 | 161.62 | 152.51 | 232 |

As indicated above, the mechanical properties were not substantially altered by the addition of Compound A.

EXAMPLE 6

Various polymers were formed as described in Example 5 at concentrations for Compound A of 0, 1, 2, 3, and 5 wt. %. The thermal properties of the polymers were tested as described above. The results are set forth below.

| Concentration of Compound A (wt. %) | Tm (° C.) | MV at 1000 s$^{-1}$ (Pa * s) at 350° C. |
|---|---|---|
| 0 | 343.72 | 79.6 |
| 1 | 333.28 | 17.7 |
| 2 | 328.25 | 6.8 |
| 3 | 320.56 | 4.6 |
| 5 | 311.37 | 3.1 |

As indicated, an increase in the concentration of Compound A resulted in a decrease in the melting point and melt viscosity.

EXAMPLE 7

A 2 L flask was charged with HBA (432.3 g), HNA (47 g), TA (134.6 g), BP (104.3 g), APAP (37.8 g), Compound E (19.65 g) and 33 mg of potassium acetate. The flask was equipped with C-shaped stirrer, a thermal couple, a gas inlet, and distillation head. The flask was placed under a low nitrogen purge and acetic anhydride (99.7% assay, 501.5 g) was added. The milky-white slurry was agitated at 75 rpm and heated to 140° C. over the course of 95 minutes using a fluidized sand bath. After this time, the mixture was then gradually heated to 350° C. steadily over 290 minutes. Reflux was seen once the reaction exceeded 140° C. and the overhead temperature increased to approximately 115° C. as acetic acid byproduct was removed from the system. During the heating, the mixture grew yellow and slightly more viscous and the vapor temperature gradually dropped to 90° C. Once the mixture had reached 350° C., the nitrogen flow was stopped. The flask was evacuated below 20 psi and the agitation slowed to 30 rpm over the course of 45 minutes. As the time under vacuum progressed, the mixture grew viscous. After 84 minutes, the reaction was stopped, no torque was observed. The reaction was then stopped by releasing the vacuum and stopping the heat flow to the reactor. The flask was cooled and then polymer was recovered as a solid, dense yellow-brown plug. Sample for analytical testing was obtained by mechanical size reduction.

EXAMPLE 8

A 2 L flask was charged with HBA (432.3 g), HNA (47 g), TA (134.6 g), BP (104.3 g), APAP (37.8 g), Compound A (19.65 g) and 33 mg of potassium acetate. The flask was equipped with C-shaped stirrer, a thermal couple, a gas inlet, and distillation head. The flask was placed under a low nitrogen purge and acetic anhydride (99.7% assay, 501.5 g) was added. The milky-white slurry was agitated at 75 rpm and heated to 140° C. over the course of 95 minutes using a fluidized sand bath. After this time, the mixture was then gradually heated to 350° C. steadily over 290 minutes. Reflux was seen once the reaction exceeded 140° C. and the overhead temperature increased to approximately 115° C. as acetic acid byproduct was removed from the system. During the heating, the mixture grew yellow and slightly more viscous and the vapor temperature gradually dropped to 90° C. Once the mixture had reached 350° C., the nitrogen flow was stopped. The flask was evacuated below 20 psi and the agitation slowed to 30 rpm over the course of 45 minutes. As the time under vacuum progressed, the mixture grew viscous. After 84 minutes, the reaction was stopped, no torque was observed. The reaction was then stopped by releasing the vacuum and stopping the heat flow to the reactor. The flask was cooled and then polymer was recovered as a solid, dense yellow-brown plug. Sample for analytical testing was obtained by mechanical size reduction.

The thermal properties of the polymers of a control sample and Examples 7-8 were tested as described above. The results are set forth below.

| Example | Oligomer | Tm (° C.) | Tc (° C.) | Intrinsic Viscosity (dL/g) | MV at 1000 s$^{-1}$ (Pa * s) at 350° C. | MV at 400 s$^{-1}$ (Pa * s) at 350° C. |
|---|---|---|---|---|---|---|
| Control | — | 343.7 | 290.8 | 8.5 | 79.6 | 129.0 |
| Ex. 7 | E | 340.37 | 290.11 | 6.5 | 43.9 | 63.5 |
| Ex. 8 | A | 320.6 | 280.7 | 4.3 | 4.6 | 7.0 |

As indicated, Compounds A and E resulted in a decrease in melt viscosity.

EXAMPLE 9

A first sample (Sample 1) was formed. A 2 L flask was charged with 4-hydroxybenzoic acid (415.7 g), 2,6-hydroxynaphthoic acid (32 g), terephthalic acid (151.2 g), 4,4'-biphenol (122.9 g), acetominophen (37.8 g), and 50 mg of potassium acetate. The flask was equipped with C-shaped stirrer, a thermal couple, a gas inlet, and distillation head. The flask was placed under a low nitrogen purge and acetic anhydride (99.7% assay, 497.6 g) was added. The milky-white slurry was agitated at 75 rpm and heated to 140° C. over the course of 95 minutes using a fluidized sand bath. After this time, the mixture was then gradually heated to 360° C. steadily over 300 minutes. Reflux was seen once the reaction exceeded 140° C. and the overhead temperature increased to approximately 115° C. as acetic acid byproduct was removed from the system. During the heating, the mixture grew yellow and slightly more viscous and the vapor temperature gradually dropped to 90° C. Once the mixture had reached 360° C., the nitrogen flow was stopped. The flask was evacuated below 20 psi and the agitation slowed to 30 rpm over the course of 45 minutes. As the time under vacuum progressed, the mixture grew viscous. After 72 minutes, the final viscosity target was reached as gauged by the strain on the agitator motor (torque value of 30 units). The reaction was then stopped by releasing the vacuum and stopping the heat flow to the reactor. The flask was cooled and then polymer was recovered as a solid, dense yellow-brown plug. Sample for analytical testing was obtained by mechanical size reduction.

A second sample (Sample 2) was formed as described for Sample 1, except that 19.65 grams of Compound D was also introduced into the reactor. It was observed that there were fewer residues in the distillate as compared to Sample 1. The reaction was stopped after 72 minutes—no torque was observed on the agitator motor.

The thermal properties of the melt polymerized polymers of Samples 1-2 were tested as described above. The results are set forth below in the following table.

| Sample | Additive | Tm (° C.) | Tc (° C.) | IV (dL/g) | MV at 1000 $s^{-1}$ (Pa * s) | MV at 400 $s^{-1}$ (Pa * s) |
|---|---|---|---|---|---|---|
| 1 | — | 361.6 | 301.8 | 8.4 | 75.7 | 118.2 |
| 2 | D | 350.6 | 299.3 | 5.3 | 46.8 | 70.7 |

EXAMPLE 10

A wholly aromatic liquid crystalline polyester (available commercially from Ticona, LLC) is initially heated to 120° C. and then powder coated with a pentaerythritol tetrastearate lubricant (Glycolube® P available from Lonza, Inc.). Compound A and glass fibers are thereafter melt blended with the polymer so that the final composition 68.3 wt. % liquid crystalline polymer, 0.3 wt. % lubricant, 30 wt. % glass fibers, and 1.4 wt. % of Compound A. Fiberglass is 3 mm chopped strand E glass with a 10 micron diameter (available from Nippon Electric Glass Co Ltd). The samples are melt-blended using a Coperion 32-mm co-rotating fully intermeshing twin screw extruder having eleven (11) temperature control zones, including one at the extrusion die. The extruder has an overall L/D of 40, with potential feed zones at an L/D of 1, 16, and 24; shear zones at an L/D of 12, 20, 28, and 32; and a degassing/vacuum zone at an L/D of 36. The polymer pellets are fed at an L/D of 1 and the glass fibers are fed at an L/D of 16 via a gravimetric feeder. Compound A is fed in conjunction with the polymer pellets at an L/D of 1. Following melt blending, the sample is quenched in a water bath to solidify and granulated in a pelletizer. All compositions are compounded at a rate of 140 pounds per hour, with a barrel temperature of 290° C. in the glass fiber mixing zone and a screw speed of 450 RPM.

EXAMPLE 11

A wholly aromatic liquid crystalline polyester (available commercially from Ticona, LLC) is initially heated to 120° C. and then powder coated with a pentaerythritol tetrastearate lubricant (Glycolube® P available from Lonza, Inc.). Compound A and glass fibers are thereafter melt blended with the polymer so that the final composition contains 68.3 wt. % liquid crystalline polymer, 0.3 wt. % lubricant, 30 wt. % glass fibers, and 1.4 wt. % of Compound A. Fiberglass is 3 mm chopped strand E glass with a 10 micron diameter (available from Nippon Electric Glass Co Ltd). The samples are melt-blended using the same extruder employed in Example 10. The polymer pellets are fed at an L/D of 1 and the glass fibers are fed at an L/D of 16 via a gravimetric feeder. Compound A is fed at an L/D of 24. Following melt blending, the sample is quenched in a water bath to solidify and granulated in a pelletizer. All compositions are compounded at a rate of 140 pounds per hour, with a barrel temperature of 290° C. in the glass fiber mixing zone and a screw speed of 450 RPM.

Comparative Examples 1-3

A sample is formed as described in Example 10 except that Compound A is not employed (Comp. Ex. 1). Samples are also formed as described in Example 10 except that 4,4'-biphenol is employed rather than Compound A. More particularly, Comp. Ex. 2 involves feeding 4,4'-biphenol in conjunction with the polymer pellets (L/D of 1) and Comp. Ex. 3 involves feeding 4,4'-biphenol downstream of the glass fibers and polymer pellets (L/D of 24). The processing conditions for all of the examples are summarized in the following table.

| | Example | | | | |
|---|---|---|---|---|---|
| | Comp Ex. 1 | Comp Ex. 2 | Comp Ex. 3 | 10 | 11 |
| L/D of Polymer Feed | 1 | 1 | 1 | 1 | 1 |
| L/D of Glass Fiber Feed | 16 | 16 | 16 | 16 | 16 |
| L/D of Compound A Feed | — | — | — | 1 | 24 |
| L/D of 4,4'-Biphenol Feed | — | 1 | 24 | — | — |
| Screw Speed | 450 | 450 | 450 | 450 | 450 |
| Throughput Rate | 140 | 140 | 140 | 140 | 140 |
| Fiber mixing temperature (° C.) | 290 | 290 | 290 | 290 | 290 |
| Torque (%) | 32-34 | 34-36 | 34-35 | 32-35 | 32-35 |
| Melt Temperature (° C.) | 341 | 339 | 341 | 343 | 341 |

Following formation, the compositions are dried for 3 hours at 120° C. and tested for melt viscosity at 350° C., which is included in the table below. The pellets are thereafter injection molded to obtain specimens for tensile, impact, flexural and deflection temperature under load measurements as well as blister performance. All compositions are injection molded at ISO 294 conditions. The pellets were first dried for 3 hours at 120° C. The following conditions are used to mold the test specimens: Barrel Temperature—315° C.; Mold Temperature—100° C.; Back Pressure—50 psi; Hold Pressure—10,000 psi; Hold Pressure Time—5 sec; Cooling Time—25 sec; and Cycle Time—40 sec. The following table shows the resulting thermal and mechanical properties.

| | Example | | | | |
|---|---|---|---|---|---|
| | Comp. Ex. 1 | Comp. Ex. 2 | Comp. Ex. 3 | Ex. 10 | Ex. 11 |
| Ash (%) | 29.6 | 29.9 | 29.6 | 29.7 | 29.5 |
| Melt Viscosity (Pa-sec at 350° C. and 1000 $s^{-1}$) | 37.2 | 24.5 | 28.2 | 6.4 | 13.1 |
| Melt Viscosity (Pa-sec at 350° C. and 400 $s^{-1}$) | 55.4 | 36.2 | 39.2 | 9.8 | 18.2 |
| Pellet Density (g/cc) | 1.564 | 1.562 | 1.568 | 1.560 | 1.558 |
| Density (%) | 96.3 | 96.2 | 96.5 | 96.1 | 95.9 |
| Melt Temperature (° C.) | 333.2 | 333.4 | 332.8 | 318.6 | 323.0 |

| | Example | | | | |
|---|---|---|---|---|---|
| | Comp. Ex. 1 | Comp. Ex. 2 | Comp. Ex. 3 | Ex. 10 | Ex. 11 |
| Crystallinity Temperature (° C.) | 295.2 | 294.1 | 294.8 | 284.8 | 289.5 |
| Blister Free Temperature (° C.) | 270 | 250 | 260 | 240 | 280 |
| Tensile Strength (MPa) | 165 | 143 | 150 | 126 | 163 |
| Tensile Elongation (%) | 1.72 | 1.55 | 1.49 | 1.31 | 1.80 |
| Tensile Modulus (MPa) | 16650 | 13950 | 14550 | 14900 | 16550 |
| Flexural Strength (MPa) | 230.57 | 204.21 | 212.32 | 204.31 | 230.13 |
| Flexural Modulus (MPa) | 17000 | 14950 | 15250 | 15100 | 16550 |
| Notched Charpy Impact Strength (kJ/m$^2$) | 36 | 29 | 27 | 10 | 37 |
| DTUL (° C.) | 265 | 250 | 252 | 234 | 265 |
| Peak Pressure to Fill (psi) | 8260 | 7890 | 8300 | 4940 | 6085 |
| Maximum Load Point (lb-f) | 11.1 | 11.5 | 10.6 | 10.7 | 11.2 |
| Warpage Unaged - LGA (mm) | 0.913 | 0.955 | 0.904 | 0.727 | 0.820 |
| Warpage Aged - LGA (mm) | 2.437 | 2.643 | 2.479 | 2.163 | 1.962 |

As indicated, the melt viscosity can be reduced by almost 80% when Compound A is fed at 1 L/D. When Compound A is fed downstream at 24 L/D (Example 11), a substantial reduction in melt viscosity is also observed. Furthermore, Example 11 also exhibited excellent mechanical and thermal properties (e.g., BFT) due to the addition of Compound A after dispersion of the glass fibers. In contrast, the use of 4,4'-biphenol resulted in a substantial reduction in mechanical properties, even when added after fiber dispersion (Comp. Ex. 3).

EXAMPLE 12

A 300-liter Hastalloy C reactor was charged with 4-hydroxybenzoic acid (65.9 lbs.), 6-hydroxy-2-naphthoic acid (7.2 lbs.), terephthalic acid (2.8 lbs.), 4,4'-biphenol (18.8 lbs.), 4-hydroxyacetanilide (5.8 lbs.), N,N-diphenyl terepthalamide (Compound A) (2.8 lbs.), and 3.4 g of potassium acetate.

The reactor was equipped with a paddle-shaped mechanical stirrer, a thermocouple, a gas inlet, and distillation head. Under a slow nitrogen purge acetic anhydride (99.7% assay, 76.1 lbs.) was added. The milky-white slurry was agitated at 120 rpm and heated to 190° C. over the course of 130 minutes. During this time approximately 42 pounds of acetic acid was distilled from the reactor. The mixture was then transferred to a 190 liter stainless steel polymerization reactor and heated at 1° C./min. to 245° C. At this point a steady reflux of byproduct acetic acid was established which reduced the heating rate to ~0.5° C./min. When the reaction mixture reached 305° C. reflux was turned off and the batch was allowed to heat at a rate of about 1° C./min. During heating, the mixture grew yellow and slightly more viscous and the vapor temperature gradually dropped below 100° C. as distillation of byproduct acetic acid came to an end. Heating continued until the batch reached the target temperature of 350° C. The nitrogen purge was stopped and a vacuum applied to slowly reduce the pressure to less than 5 mm over a 45 minute period. As the time under vacuum progressed the last traces of acetic acid were removed and the batch became more viscous. After 30 minutes under full vacuum (less than 5 mm) nitrogen was admitted to the system and the molten polymer was extruded from the reactor at 3 PSIG pressure through a 3-hole die plate. The polymer strands were cooled and solidified by running through a water bath and then chopped into pellets.

The polymer had a melting temperature ($T_m$) of 325.6° C. and a melt viscosity of 5.0 Pa-s at a shear rate of 1000 sec$^{-1}$ as measured by capillary rheology at a temperature of 350° C.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A thermotropic liquid crystalline polymer composition comprising a liquid crystalline polymer and an aromatic amide oligomer having the following general formula (I):

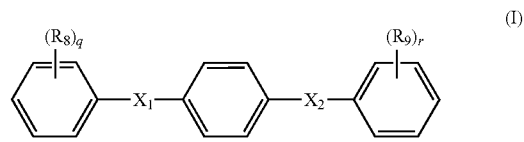

wherein,

X$_1$ and X$_2$ are independently C(O)HN or NHC(O);

R$_8$ and R$_9$ are independently selected from halo, haloalkyl, alkyl, alkenyl, alkynyl, aryl, and cycloalkyl, and q and r are 0.

2. The polymer composition of claim 1, wherein the liquid crystal polymer is wholly aromatic.

3. The polymer composition of claim 1, wherein the aromatic amide oligomer has a molecular weight of about 2,000 grams per mole or less.

4. The polymer composition of claim 1, wherein the oligomer is selected from the group consisting of the following compounds and combinations thereof:

| Structure | Name |
|---|---|
| 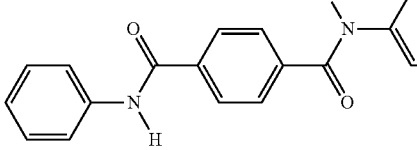 | N1,N4-diphenyl-tere-phthal-amide |

| Structure | Name |
|---|---|
| 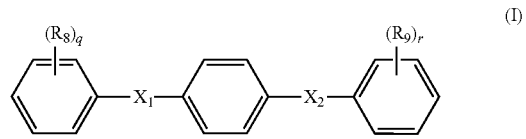 | N1,N4-diphenyl-isoterephthal-amide. |

5. The polymer composition of claim 1, wherein the oligomer is N1,N4-diphenylterephthalamide.

6. The polymer composition of claim 1, wherein the liquid crystalline polymer is a wholly aromatic polyester or polyesteramide.

7. The polymer composition of claim 1, wherein aromatic amide oligomers are employed in an amount of from about 0.1 to about 5 parts by weight relative to 100 parts by weight of the liquid crystalline polymer.

8. The polymer composition of claim 1, wherein the ratio of the melt viscosity of the liquid crystalline polymer to the melt viscosity of the polymer composition is at least about 1.1.

9. The polymer composition of claim 1, wherein the ratio of the melt viscosity of the liquid crystalline polymer to the melt viscosity of the polymer composition is from about 2 to about 40.

10. A filled composition comprising the polymer composition of claim 1 and a filler material.

11. The filled polymer composition of claim 10, wherein the filler material comprises fibers, a mineral filler, or a combination thereof.

12. A molded article comprising the polymer composition of claim 1.

13. A method for forming a thermotropic liquid crystalline polymer composition, the method comprising melt blending a liquid crystalline polymer and an aromatic amide oligomer having the following formula (I):

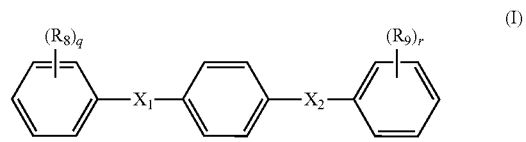

wherein,
$X_1$ and $X_2$ are independently C(O)HN or NHC(O);
$R_8$ and $R_9$ are independently selected from selected from halo, unsubstituted aryl, unsubstituted cycloalkyl, aryl and/or cycloalkyl substituted with an amide group having the structure: —C(O)$R_{12}$N— or —N$R_{13}$C(O)—, wherein $R_{12}$ and $R_{13}$ are independently selected from hydrogen, alkyl, alkenyl, alkynyl, aryl, and cycloalkyl; and
q and r are independently from 1 to 5.

14. The method of claim 13, wherein the thermotropic liquid crystalline polymer is wholly aromatic.

15. The method of claim 13, wherein the aromatic amide oligomer has a molecular weight of about 2,000 grams per mole or less.

16. The method of claim 13, wherein the aromatic amide oligomer has from 2 to 8 amide functional groups per molecule.

17. The method of claim 13, further comprising blending a filler material with the liquid crystalline polymer composition to form a filled polymer composition.

18. The method of claim 17, wherein the filler material comprises fibers, a mineral filler, or a combination thereof.

19. The method of claim 18, wherein the filler material is blended with the liquid crystal polymer prior to blending the aromatic amide oligomer with the liquid crystal polymer.

20. The polymer composition of claim 1, wherein the liquid crystalline polymer is thermoplastic.

21. A thermotropic liquid crystalline polymer composition comprising a liquid crystalline polymer and an aromatic amide oligomer having the following general formula (I):

(I)

wherein,
$X_1$ and $X_2$ are independently C(O)HN or NHC(O);
$R_8$ and $R_9$ are independently selected from halo, unsubstituted aryl, unsubstituted cycloalkyl, aryl and/or cycloalkyl substituted with an amide group having the structure: —C(O)$R_{12}$N— or —N$R_{13}$C(O)—, wherein $R_{12}$ and $R_{13}$ are independently selected from hydrogen, alkyl, alkenyl, alkynyl, aryl, and cycloalkyl;
q and r are independently from 1 to 5.

22. The polymer composition of claim 21, wherein the liquid crystal polymer is wholly aromatic.

23. The polymer composition of claim 21, wherein the aromatic amide oligomer has a molecular weight of about 2,000 grams per mole or less.

24. The polymer composition of claim 21, wherein the aromatic amide oligomer has from 2 to 8 amide functional groups per molecule.

25. The polymer composition of claim 21, wherein $R_8$ and $R_9$ are phenyl substituted with —C(O)HN— or —NHC(O)—.

26. The polymer composition of claim 21, wherein $R_8$, $R_9$, or both are aryl.

27. The polymer composition of claim 21, wherein the oligomer is selected from the group consisting of the following compounds and combinations thereof:

| Structure | Name |
|---|---|
| | N1,N4-bis(2,3,4,5,6-pentafluorophenyl)terephthalamide |

| Structure | Name |
|---|---|
| | N1,N4-bis(4-benzamidophenyl)terephthalamide |
| | N4-phenyl-N1-[4-[[4-(phenylcarbamoyl)benzoyl]amino]phenyl]terephthalamide |
| | N4-phenyl-N1-[3-[[4-(phenylcarbamoyl)benzoyl]amino]phenyl]terephthalamide |
| | N1,N3-bis(4-benzamidophenyl)benzene-1,3-dicarboxamide |
| | N3-phenyl-N1-[3-[[3-(phenylcarbamoyl)benzoyl]amino]phenyl]benzene-1,3-dicarboxamide |

| Structure | Name |
|---|---|
| | N1,N3-bis(3-benzamidophenyl)benzene-1,3-dicarboxamide |
| | N1,N3-bis(4-phenylphenyl)benzene-1,3-dicarboxamide. |

28. The polymer composition of claim 21, wherein the liquid crystalline polymer is a wholly aromatic polyester or polyesteramide.

29. The polymer composition of claim 21, wherein aromatic amide oligomers are employed in an amount of from about 0.1 to about 5 parts by weight relative to 100 parts by weight of the liquid crystalline polymer.

30. The polymer composition of claim 21, wherein the ratio of the melt viscosity of the liquid crystalline polymer to the melt viscosity of the polymer composition is at least about 1.1.

31. The polymer composition of claim 21, wherein the ratio of the melt viscosity of the liquid crystalline polymer to the melt viscosity of the polymer composition is from about 2 to about 40.

32. A filled composition comprising the polymer composition of claim 21 and a filler material.

33. The filled polymer composition of claim 10, wherein the filler material comprises fibers, a mineral filler, or a combination thereof.

34. The polymer composition of claim 21, wherein the liquid crystalline polymer is thermoplastic.

35. A molded article comprising the polymer composition of claim 21.

36. A thermotropic liquid crystalline polymer composition comprising a liquid crystalline polymer and an aromatic amide oligomer, wherein the oligomer is selected from the group consisting of the following compounds and combinations thereof:

| Structure | Name |
|---|---|
| | N1,N4-diphenylterephthalamide |
| | N1,N4-diphenylisoterephthalamide |

-continued

| Structure | Name |
|---|---|
| | N1,N4-bis(2,3,4,5,6-pentafluorophenyl)terephthalamide |
| | N1,N4-bis(4-benzamidophenyl)terephthalamide |
| | N4-phenyl-N1-[4-[[4-(phenylcarbamoyl)benzoyl]amino]-phenyl]terephthalamide |
| | N4-phenyl-N1-[3-[[4-(phenylcarbamoyl)benzoyl]amino]-phenyl]terephthalamide |
| | N1,N3-bis(4-benzamidophenyl)-benzene-1,3-dicarboxamide |

-continued

| Structure | Name |
|---|---|
| | N3-phenyl-N1-[3-[[3-(phenylcarbamoyl)benzoyl]amino]phenyl]benzene-1,3-dicarboxamide |
| | N1,N3-bis(3-benzamidophenyl)-benzene-1,3-dicarboxamide |
| | N1,N4-bis(4-pyridyl)terephthalamide |
| | N1,N3-bis(4-phenylphenyl)-benzene-1,3-dicarboxamide |
| | N2,N7-dicyclohexylnaphthalene-2,7-dicarboxamide |

| Structure | Name |
| --- | --- |
| (structure) | N2,N6-dicyclohexylnaphthalene-2,6-dicarboxamide |
| (structure) | 1,3-Benzenedicarboxamide, N1,N3-dicyclohexyl- |
| (structure) | 1,4-Benzenedicarboxamide, N1,N3-dicyclohexyl-. |

37. The polymer composition of claim 36, wherein the liquid crystalline polymer is a wholly aromatic polyester or polyesteramide.

38. The polymer composition of claim 36, wherein aromatic amide oligomers are employed in an amount of from about 0.1 to about 5 parts by weight relative to 100 parts by weight of the liquid crystalline polymer.

39. The polymer composition of claim 36, wherein the liquid crystalline polymer is thermoplastic.

* * * * *